(12) United States Patent
Aoshima et al.

(10) Patent No.: US 6,939,644 B2
(45) Date of Patent: Sep. 6, 2005

(54) LITHIUM SECONDARY CELL

(75) Inventors: Takayuki Aoshima, Yokohama (JP);
Iwao Soga, Yokohama (JP)

(73) Assignee: Mitsubishi Chemical Corporation, Tokyo (JP)

( * ) Notice: Subject to any disclaimer, the term of this patent is extended or adjusted under 35 U.S.C. 154(b) by 0 days.

(21) Appl. No.: 10/683,285

(22) Filed: Oct. 14, 2003

(65) Prior Publication Data
US 2004/0076883 A1 Apr. 22, 2004

Related U.S. Application Data

(63) Continuation of application No. PCT/JP02/03783, filed on Apr. 16, 2002.

(30) Foreign Application Priority Data
Apr. 16, 2001 (JP) .................................. 2001-117082

(51) Int. Cl.[7] ........................ H01M 10/40; H01M 2/02; H01M 4/02
(52) U.S. Cl. .............................. 429/231.95; 429/231.1; 429/223
(58) Field of Search ....................... 429/223, 231.1, 429/231.95, 341

(56) References Cited

U.S. PATENT DOCUMENTS

| | | | | |
|---|---|---|---|---|
| 5,275,750 A | * | 1/1994 | Sato et al. | ........... 252/62.2 |
| 5,432,027 A | * | 7/1995 | Tuttle et al. | ........... 429/127 |
| 6,682,847 B2 | * | 1/2004 | Inoue et al. | ........... 429/167 |

FOREIGN PATENT DOCUMENTS

| | | |
|---|---|---|
| EP | 0 824 087 | 2/1998 |
| JP | 59-3872 | 1/1984 |
| JP | 10-92429 | 4/1998 |
| JP | 10-162830 | 6/1998 |
| JP | 11-25956 | 1/1999 |
| JP | 2000-58117 | 2/2000 |
| JP | 2000-195557 | 7/2000 |
| JP | 2000-331683 | 11/2000 |
| JP | 2002-117904 | 4/2002 |

OTHER PUBLICATIONS

Machine Translation of JP 2000–195557 from JPO Internet site, Jul. 2000.*
U.S. Appl. No. 10/727,661, filed Dec. 5, 2003.
U.S. Appl. No. 10/227,812, filed Aug. 27, 2002, Aoshima et al.

* cited by examiner

Primary Examiner—Gregg Cantelmo
(74) Attorney, Agent, or Firm—Oblon, Spivak, McClelland, Maier & Neustadt, P.C.

(57) ABSTRACT

To increase safety against overcharging of a lithium secondary cell which uses a lithium-nickel compound oxide as a positive electrode active material. A lithium secondary cell comprises a casing (2,3) and a lithium secondary cell element (1) using a lithium-nickel compound oxide as a positive electrode active material, accommodated in the casing. The specific surface area of the lithium-nickel compound oxide is from 0.1 to 10 $m^2/g$, and a surface area capacity ratio S/C, i.e. a ratio of a cell surface area S ($cm^2$) to a cell capacity (mAh), is from 0.05 to 5.

20 Claims, 10 Drawing Sheets

Fig. 14
(A)
40 METAL LAYER
41 SYNTHETIC RESIN LAYER
(B)
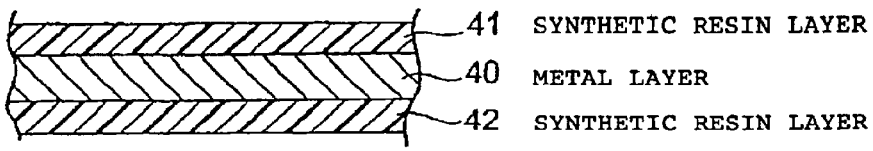
41 SYNTHETIC RESIN LAYER
40 METAL LAYER
42 SYNTHETIC RESIN LAYER
(C)
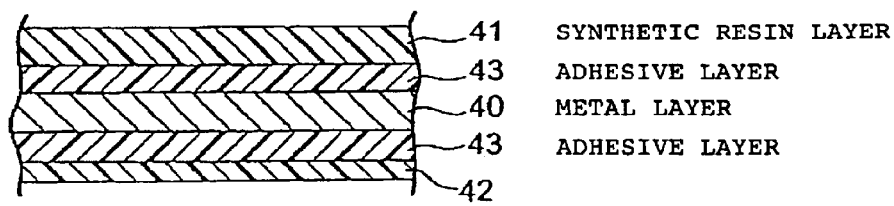
41 SYNTHETIC RESIN LAYER
43 ADHESIVE LAYER
40 METAL LAYER
43 ADHESIVE LAYER
42

LITHIUM SECONDARY CELL

TECHNICAL FIELD

The present invention relates to a lithium secondary cell. Particularly, it relates to a lithium secondary cell having a cell element using a lithium-nickel compound oxide as a positive electrode active material, accommodated in a casing and having safety during overcharging increased.

BACKGROUND ART

For a lithium secondary cell (in this specification, a lithium secondary cell may sometimes be referred to as a secondary cell or a cell) having a high energy density which has been developed in recent years, it is important to secure safety, particularly to secure safety against overcharging, because of the high level of the energy density. The reason is as follows.

Namely, at the time of charging a lithium secondary cell, the lithium secondary cell will be in an overcharged state, if a more than the prescribed level of electric current or voltage is applied for some reasons, or if more than the prescribed level of capacity is charged. Consequently, it is likely that a positive electrode active material or a negative electrode active material, as a material constituting the lithium secondary cell, tends to be chemically unstable, or that internal short circuiting between electrodes takes place, which causes an excessive increase of the cell temperature and so on. In fact, if a lithium secondary cell is in an overcharged state, a gas may be generated by decomposition of the electrolytic solution, etc. By such generation of a gas, not only bursting, leakage, etc. of the cell is likely to occur, but also, if such a state continues, finally, the cell temperature may increase excessively, whereby the cell is likely to catch fire or explode.

Therefore, various studies have been made to prevent such overcharging, and the following methods ① to ④ have, for example, been proposed.

① A method for controlling a charging current by an electronic circuit (safety circuit) attached outside the cell, when the cell becomes a dangerous state by overcharging.

② A method for shutting off a charging current by increasing the internal pressure of the cell by means of a gas generated by the decomposition of the electrolytic solution, etc. at the time of overcharging, thereby to let a safety valve mechanically operate to shut off the charging current.

③ A method for shutting off a charging current by closing pores of the separator by utilizing fusion of the separator due to the temperature rise of the cell.

④ A method for controlling a runaway reaction in the cell at the time of overcharging, by adding to the electrolytic solution an organic additive having an oxidation potential nobler than the positive electrode potential at the time of the full charge, to induce an oxidation reaction of the organic additive when the positive electrode potential rises by overcharging.

Whereas, in the field of a lithium secondary cell, as an improvement from the structural aspect of a secondary cell, a cell of a type has been developed in recent years in which a flat plate-like casing is constructed by using a lightweight sheathing member like a laminated film having a resin layer formed on each side of a gas barrier layer, and a cell element having a positive electrode and a negative electrode is sealed in the casing. In such a cell, a lightweight film is used as a sheathing member, whereby as compared with a conventional cell using a metal casing, the cell can be made light in weight and small in size, and the construction of the casing is simple, which is advantageous from the viewpoint of costs.

Further, as an improvement from the material aspect of particularly a lithium secondary cell among secondary cells, a lithium-nickel compound oxide such as lithium nickelate having a layered structure and having $LiNiO_2$ as the basic composition, has attracted attention as a material having a high capacity to be substituted for $LiCoO_2$ which has heretofore been used as a positive electrode active material for a lithium secondary cell.

Here, among the above-mentioned methods ① to ④ to secure safety of the cell at the time of overcharging, the method for controlling by means of a safety circuit or the method for mechanically shutting off the charging current by a safety valve, has a problem such that it is required to mount an electronic circuit or a safety valve on the cell, whereby the cost for the cell tends to increase, or there may be a restriction in the design of the cell. Especially the cell of the type in which the cell element is sealed in the flat plate-like casing made of the above-mentioned laminated film, has a structure on which the above-mentioned safety circuit or safety valve can hardly be attached, since the laminated film has a variable shape.

Further, by the above-mentioned method ③ for shutting off the charging current by melting the separator, there may be a case where the runaway reaction at the time of overcharging is so abrupt that melting of the separator may not be made in time, and no adequate safety can be secured at the time of overcharging. Further, in a case where a gel electrolyte as a non-fluid electrolyte is used as the electrolyte for a lithium secondary cell from the viewpoint of the liquid-holding property, it is likely that the gel electrolyte impregnated into pores of the separator tends to hinder closing of pores by melting of the separator, whereby shutting off of the charging current tends to be incomplete.

Further, in the above-mentioned method ④ for controlling the runaway reaction in the cell at the time of overcharging, by adding to the electrolytic solution an overcharging preventive agent such as an organic additive, an overcharging preventive agent which is not directly involved in the usual charging or discharging of the cell, is added to the electrolytic solution, whereby there may be a case where an adverse effect may be presented to the cell performance other than the overcharging characteristics. Further, a gas is likely to be generated as a result of the oxidation reaction of the overcharging preventive agent at the time of overcharging, whereby corrosion of instruments by such a generated gas, or leakage, etc. of a toxic gas such as an organic gas may be feared.

As mentioned above, a sufficiently satisfactory technique as a safety measure at the time of overcharging has not yet been presented. On the other hand, with a lithium secondary cell using a lithium-nickel compound oxide expected to be a high capacity positive electrode active material for a lithium secondary cell, the reactivity of the surface of the lithium-nickel compound oxide present in a particle state in the positive electrode, is high, whereby the safety at the time of overcharging or the like tends to be relatively low.

Accordingly, for a lithium secondary cell using a lithium-nickel compound oxide as a positive electrode active material, it is desired to develop a more secure safety measure against overcharging. Further, in recent years, a higher safety has become required for a cell, as a lithium secondary cell has been used as a power source for an instrument carried by human being, such as a portable phone. Further, it is desired to reduce the cost by simplifying the safety valve or the safety circuit, and it is strongly desired to improve the essential safety of the lithium secondary cell itself.

The present invention has been made in view of the above-described prior art, and its object is to provide a lithium secondary cell which is a lithium secondary cell using a lithium-nickel compound oxide as a positive electrode active material, whereby the safety against overcharging has been more improved.

DISCLOSURE OF THE INVENTION

As a result of an extensive study to accomplish the above object, the present inventors have found that on the basis that a lithium-nickel compound oxide having a specific surface area, is used, the safety at the time of overcharging can be improved by adjusting the value of the surface area per capacity of the lithium secondary cell, and thus have completed the present invention.

Namely, the gist of the present invention resides in a lithium secondary cell comprising a lithium secondary cell element using, as a positive electrode active material, a lithium-nickel compound oxide containing lithium and nickel, accommodated in a casing, wherein the specific surface area of the lithium-nickel compound oxide is from 0.1 to 10 $m^2/g$, and a surface area capacity ratio S/C, i.e. a ratio of a cell surface area S ($cm^2$) to a cell capacity C (mAh), is from 0.05 to 5.

Here, the cell surface area (S) and the cell capacity (C) in the present invention are as defined below.

Cell Surface Area (S)

The cell surface area S means the outside surface area of the casing accommodating the cell element. Namely, in a case where a laminated film having a gas barrier layer and a resin layer laminated is, for example, used for the casing, it means the surface area of the laminated film. Otherwise, in a case where a metal casing is used as the casing, it means the surface area of the metal portion.

With a cell casing, its entire portion does not necessarily contribute to heat release. For example, the degree of contribution to heat release, of the after-mentioned bonded portions along the periphery of the sheathing member is small. However, in a cell, the proportion occupied by such bonding portions in the entire surface area is usually small, and accordingly, the entire outside surface area of the casing may be used as the cell surface area S, which will be a reference to evaluate the safety at the time of overcharging.

Cell Capacity (C)

The cell capacity is the maximum capacity obtainable by a discharge from 4.2 V to 3.0 V. Specifically, it is the discharge capacity obtainable when the cell is discharged from a fully charged state of 4.2 V to 3.0 V at such a current that 3.0 V will be reached at 10 hours.

Here, the fully charged state of the cell is obtained usually by carrying out constant current charging at 1 CmA until 4.2 V is reached, and then carrying out constant voltage charging at 4.2 V until the change in the charging current Ic in 1 hour i.e. dIc/dt, becomes within 10%. The above constant voltage charging may be explained in further detail in such a way that when the charging current at a time (t) is XmA, charging will be completed when the charging current upon expiration of 1 hour (t+1 hour) becomes larger than 0.9 XmA.

As described above, the lithium-nickel compound oxide is present in a particle state in the positive electrode. Such a particulate lithium-nickel compound oxide (in the present invention, the particulate lithium-nickel compound oxide may sometimes be referred to simply as a lithium-nickel compound oxide) has a high reactivity at such a particle surface, whereby it has been regarded to have a problem in the safety at the time of overcharging. Accordingly, it has been considered better to control the reactivity at the time of overcharging by minimizing the specific surface area of the lithium-nickel compound oxide, in order to improve the safety at the time of overcharging. On the other hand, if the specific surface area of the lithium-nickel compound oxide is reduced, cell characteristics such as charged-discharge characteristics (rate characteristics) at a high current value tend to be deteriorated. And, this problem attributable to the specific surface area has been one of the factors which hinder a practical application of a lithium secondary cell using a lithium-nickel compound oxide.

In the present invention, from a viewpoint totally different from the prior art concept intended to reduce the reactivity at the time of overcharging by minimizing the specific surface area of the lithium-nickel compound oxide, the high surface reactivity of the lithium-nickel compound oxide is rather utilized to secure the safety of the lithium secondary cell itself at the time of overcharging.

Namely, when a reaction takes place at the surface of the lithium-nickel compound oxide at the time of overcharging, the surface of the lithium-nickel compound oxide changes from the initial state and then is deactivated. And, if the surface of the lithium-nickel compound oxide is deactivated in such a manner, the portion of the lithium-nickel compound oxide which is located at the interior of the lithium-nickel compound oxide and which is not deactivated, will be inactive without undergoing any decomposition reaction, whereby a runaway reaction will not take place. Thus, along with the deactivation at the surface of the lithium-nickel compound oxide, the reaction at the surface of the lithium-nickel compound oxide will be suppressed, and at the same time, the lithium-nickel compound oxide portion which is present at the interior of the particle and which will be inactive, will increase, whereby the lithium secondary cell will be in a safe state. In such a case, the deactivated portion will have the reactivity reduced and will not be involved in a runaway reaction, whereby the larger the deactivated portion, the higher the safety of the cell. And, the deactivation of the lithium-nickel compound oxide proceeds by the reaction at the surface of the particulate lithium-nickel compound oxide. Accordingly, as is different from the conventional concept, the larger the specific surface area, the higher the proportion of the portion to be deactivated in the lithium-nickel compound oxide, whereby the cell tends to transfer to a safer state.

However, a reaction heat will be generated along with the deactivation at the surface of the lithium-nickel compound oxide. Therefore, if the speed of generation of this reaction heat tends to be too high, the rise of the cell temperature due to the reaction heat tends to be large, whereby a runaway reaction is likely to be induced at the time of overcharging. In the present invention, even in a case where the above reaction heat becomes large, the surface area of the entire lithium secondary cell to the capacity of the lithium secondary cell is adjusted to be relatively large, whereby heat release of the reaction heat will be accelerated, and the runaway reaction of the cell can be suppressed.

Namely, in the present invention, a lithium-nickel compound oxide having a specific surface area, is employed, and the lithium-nickel compound oxide is positively deactivated at the time of overcharging to quickly bring the lithium secondary cell to a safe state, and the proportion of the surface area to the capacity of the lithium secondary cell is regulated to efficiently release the reaction heat generated by the deactivation and thereby to certainly secure the safety of the lithium secondary cell at the time of overcharging.

BRIEF DESCRIPTION OF THE DRAWINGS

FIG. 14: Each of (A) to (C) illustrates an example of a composite material constituting a sheathing member.

Explanation of the reference numerals

Figure 1:
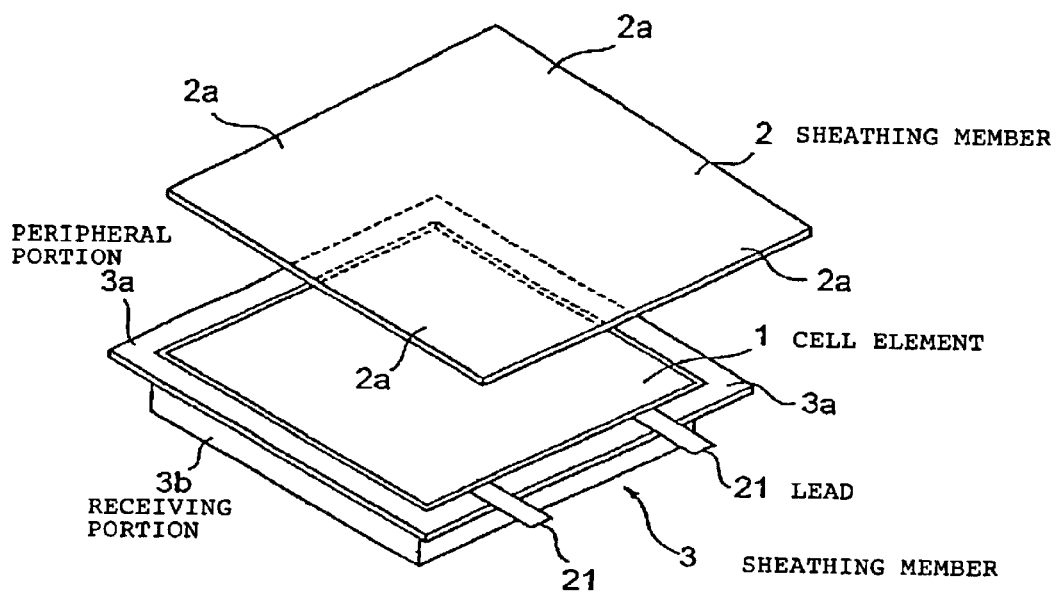
FIG. 1: An exploded perspective view of a cell according to an embodiment.

1: cell element
2, 3, 6, 7, 8, 9: sheathing member
4a, 4b: tab
21: electric lead
22: positive electrode current collector
23: positive electrode active material
24: spacer (electrolyte layer)
25: negative electrode active material
26: negative electrode current collector
31: positive electrode
31a: positive electrode active material
32: negative electrode
32b: negative electrode active material
33: non-fluid electrolyte layer
35a: positive electrode current collector
35b: negative electrode current collector
40: gas barrier layer
41, 42: synthetic resin layer
43: adhesive layer

BEST MODE FOR CARRYING OUT THE INVENTION

The lithium secondary cell of the present invention is a lithium secondary cell comprising a casing and a lithium secondary cell element using, as a positive electrode active material, a lithium-nickel compound oxide containing lithium and nickel, accommodated in the casing, wherein the specific surface area of the lithium-nickel compound oxide is from 0.1 to 10 $m^2/g$, and a surface area capacity ratio S/C, i.e. a ratio of a cell surface area S ($cm^2$) to a cell capacity C (mAh), is from 0.05 to 5.

With a lithium secondary cell having such a construction, it will be possible to certainly make the cell in a safe state by positively deactivating the surface of the lithium-nickel compound oxide, while maintaining the temperature rise at a low level at the time of overcharging.

In the present invention, if the specific surface area of the lithium-nickel compound oxide is too large, the capacity of the cell decreases. Further, due to e.g. a viscosity increase when formed into a coating material, there will be a difficulty in the production process. On the other hand, if it is too small, the cell characteristics such as rate characteristics or cycle characteristics tend to be deteriorated. Accordingly, the specific surface area is at least 0.1 $m^2/g$, preferably at least 0.5 $m^2/g$, more preferably at least 1 $m^2/g$. On the other hand, it is at most 10 $m^2/g$, preferably at most 5 $m^2/g$, more preferably at most 3 $m^2/g$. By adjusting the specific surface area within the above range, it will be possible to positively induce deactivation of the surface of the lithium-nickel compound oxide at the time of overcharging and thus to maintain the cell characteristics and the operation efficiency during the production to be good. The specific surface area is measured in accordance with the BET method.

In the present invention, as the positive electrode active material, a lithium-nickel compound oxide is used.

The lithium-nickel compound oxide is an oxide containing at least lithium, nickel and oxygen. The lithium-nickel compound oxide has a large current capacity per unit weight and thus is a very useful positive electrode material with a view to making the capacity high. As such a lithium-nickel compound oxide, a lithium-nickel compound oxide like $LiNiO_2$ having a layered structure such as an $\alpha$-$NaCrO_2$ structure, is preferred. As a specific composition, $LiNiO_2$, $Li_2NiO_2$ or $LiNiO_4$ may, for example, be mentioned, and $LiNiO_2$ may be mentioned as preferred.

The lithium-nickel compound oxide in the present invention, may be one having a part of lithium sites or nickel sites substituted by another element. By carrying out such element substitution, it is possible to improve the stability of the crystal structure, to facilitate the diffusion of Li and to improve the discharging characteristics, capacity characteristics, high temperature characteristics or overcharging characteristics. Particularly, the lithium-nickel compound oxide is preferably one having a part of Ni sites substituted by an element other than Ni. By having a part of Ni sites substituted by another element, it is possible to improve the stability of the crystal structure, and the decrease in capacity caused by transfer of a part of Ni elements to Li sites during the repeated charge and discharge, can be suppressed, whereby the cycle characteristics will also be improved. Further, by having a part of Ni sites substituted by an element other than Ni, a runaway reaction of the lithium-nickel compound oxide at the time of an increase of the cell temperature, can be suppressed, and consequently, the safety will be improved.

The element for such substitution (hereinafter referred to as the "substituting element") may be one or more selected from e.g. F, P, S, Al, Ti, V, Cr, Mn, Fe, Co, Li, Ni, Cu, Zn, Mg, Ga and Zr, preferably Al, Cr, Fe, Co, Li, Ni, Mg or Ga, more preferably Co or Al. By substituting Co or Al for a part of Ni element, it is possible to increase the effects for improving the safety or cycle characteristics. Needless to say, Ni sites or Li sites may be substituted by two or more different types of other elements.

The proportion of substitution by the substituting element is usually at least 2.5 mol %, preferably at least 5 mol %, based on the base element and is usually at most 50 mol %, preferably at most 30 mol %, more preferably at most 20 mol %, based on the base element. If this proportion of substitution is too small, the effects for improving the characteristics such as cycle characteristics may not be sufficient, and if it is too large, the cell capacity may decrease.

Further, the lithium-nickel compound oxide may have a small amount of oxygen deficiency or non-stoichiometric nature. Further, a part of oxygen sites may be substituted by sulfur or a halogen element.

In the present invention, a particularly preferred lithium-nickel compound oxide is represented by the formula $Li_\alpha Ni_X Co_Y Al_Z O_2$. Namely, a lithium-nickel compound oxide having a part of Ni sites substituted by Co and/or Al, is particularly preferred. If a part of Ni sites is substituted by Co, the crystal structure may be stabilized, whereby the cycle characteristics may be improved. Further, there is a merit that the production control will be easy. Further, if a part of Ni sites is substituted by Al, the crystal structure may be stabilized in the same manner as in the case of substitution by Co. By such substitution by Al, the degree of the capacity decrease tends to increase, although the effects for stabilizing the crystal structure may be higher than Co. With respect to $\alpha$, X, Y and Z in the formula $Li_\alpha Ni_X Co_Y Al_Z$, the usual ranges, preferred ranges and more preferred ranges are as follows (provided that X+Y+Z is from 0.9 to 1.1, preferably 1).

TABLE 1

|  | $\alpha$ | X | Y | Z |
|---|---|---|---|---|
| Usual ranges | 0.95–1.15 | 0.5–1.0 | 0–0.5 | 0–0.1 |
| Preferred ranges | 1.00–1.10 | 0.7–0.9 | 0–0.3 | 0–0.05 |
| More preferred ranges | 1.00–1.05 | 0.65–0.85 | 0.1–0.3 | 0.01–0.05 |

Further, the average secondary particle size of the lithium-nickel compound oxide is usually at least 0.1 μm, preferably at least 0.2 μm, more preferably at least 0.3 μm, most preferably at least 0.5 μm, and it is usually at most 300 μm, preferably at most 100 μm, more preferably at most 50 μm most preferably at most 20 μm. If this average particle size is too small, the cycle deterioration of the cell may increase, and if it is too large, the internal resistance of the cell may increase, whereby the output tends to be hardly obtainable.

In the present invention, as the positive electrode active material, another positive electrode active material may be used in combination with such a lithium-nickel compound oxide. The method for such a combination may be mixing of independent particles, coexistence within agglomerated particles, or particles having a multilayered structure wherein one of them constitutes a core and the other constitutes a coating layer. Among them, mixing of independent particles or particles having a multilayer structure, are particularly preferred. The mixing ratio is preferably such that the proportion of the lithium-nickel compound oxide will be at least 50 wt % of the entire positive electrode active material, from the viewpoint of the capacity.

As the positive electrode active material to be used in combination with the lithium-nickel compound oxide, various inorganic compounds may be mentioned, such as a transition metal oxide, a compound oxide of lithium and a transition metal, other than a lithium-nickel compound oxide, or a transition metal sulfide. Here, the transition metal may, for example, be Fe, Co, Ni or Mn. The transition metal oxide may specifically be a powder of e.g. MnO, $V_2O_5$, $V_6O_{13}$ or $TiO_2$. The compound oxide of lithium and a transition metal, other than the lithium-nickel compound oxide, may specifically be a powder of e.g. a lithium-cobalt compound oxide or a lithium-manganese compound oxide. Further, the transition metal sulfide may specifically be a powder of e.g. $TiS_2$, FeS or $MoS_2$. These compounds may be those having elements partially substituted in order to improve their characteristics. Further, an organic compound such as a polyaniline, a polypyrrole, a polyacene, a disulfide compound, a polysulfide compound or an N-fluoropyridinium salt, may be employed. Such inorganic compounds and organic compounds may be used as mixed.

The particle size of the above-mentioned positive electrode active material to be used in combination with the lithium-nickel compound oxide is usually from 1 to 30 μm, preferably from 1 to 10 μm. If the particle size is too large or too small, the cell characteristics such as rate characteristics or cycle characteristics, tend to deteriorate.

Among such positive electrode active materials, preferred is a compound oxide of lithium and a transition metal, other than the lithium-nickel compound oxide. Specifically, it is a lithium-cobalt compound oxide such as $LiCoO_2$, or a lithium-manganese compound oxide such as $LiMn_2O_4$.

It is more preferred to employ a lithium-cobalt compound oxide as the positive electrode active material to be used in combination with the lithium-nickel compound oxide. The lithium-cobalt compound oxide is a material having high safety, although the capacity is poor as compared with the lithium-nickel compound oxide. Accordingly, when it is used in combination with the lithium-nickel compound oxide, the balance between the cell capacity and the safety at the time of overcharging can be maintained excellently.

With the lithium-cobalt compound oxide, the discharge curve is flat, and it is therefor a useful positive electrode active material excellent in rate characteristics. As the lithium-cobalt compound oxide, $LiCoO_2$ having a layered structure, may, for example, be mentioned. Further, the lithium-cobalt compound oxide may be one having a part of sites occupied by Co, substituted by an element other than Co. By having Co sites substituted by another element, there may be a case where the cycle characteristics or rate characteristics of the cell are improved. At the time of having a part of sites occupied by Co, substituted by an element other than Co, the substituting element may, for example, be Al, Ti, V, Cr, Mn, Fe, Li, Ni, Cu, Zn, Mg, Ga, Zr, Sn, Sb or Ge, preferably Al, Cr, Fe, Li, Ni, Mg, Ga, Zr, Sn, Sb or Ge, more preferably Al, Mg, Zr or Sn. Further, Co sites may be substituted by two or more other elements.

When the substituting element substitutes Co sites, its proportion is usually at least 0.03 mol %, preferably at least 0.05 mol %, based on the Co element, and it is usually at most 30 mol %, preferably at most 20 mol %, based on the Co element. If the proportion of substitution is too small, improvement of the stability of the crystal structure tends to be inadequate, and if it is too large, there may be a case where the capacity deteriorates, when a cell is prepared.

The lithium-cobalt compound oxide is usually represented by $LiCoO_2$ as a basic composition before charging, but as mentioned above, a part of Co sites may be substituted by other elements. Further, in the above-mentioned composition formula, there may be a small amount of oxygen deficiency or non-stoichiometric nature, and a part of oxygen sites may be substituted by sulfur or a halogen element. Further, in the above-mentioned composition formula, the amount of lithium may be made to be excessive or deficient.

The specific surface area of the lithium-cobalt compound oxide is usually at least 0.01 $m^2/g$, preferably at least 0.1 $m^2/g$, more preferably at least 0.4 $m^2/g$, and usually at most 10 $m^2/g$, preferably at most 5.0 $m^2/g$, more preferably at most 2.0 $m^2/g$. If the specific surface area is too small, the rate characteristics may be lowered, and the capacity may also be lowered in some cases, and if it is too large, an undesirable reaction with e.g. the electrolytic solution may be induced, and the cycle characteristics may be lowered. The measurement of the specific surface area is carried out according to BET method.

The average particle diameter of the lithium-cobalt compound oxide is usually at least 0.1 $\mu$m, preferably at least 0.2 $\mu$m, more preferably at least 0.3 $\mu$m, most preferably at least 0.5 $\mu$m, and usually at most 300 $\mu$m, preferably at most 100 $\mu$m, more preferably at most 50 $\mu$m, most preferably at most 20 $\mu$m. If the average particle diameter is too small, the cell's cycle deterioration may become large, or a safety problem may occur, and if it is too large, the internal resistance of the cell becomes large, and it tends to be difficult to obtain a sufficient output.

Materials constituting the positive electrode other than the positive electrode active material, and other materials constituting the lithium secondary cell, will be described hereinafter.

In the present invention, the ratio S/C of the cell surface area S to the cell capacity C of the lithium secondary cell, is controlled to be within a prescribed range. Namely, if S/C is too small, no adequate amount of heat release can be accomplished against generation of a reaction heat accompanying the deactivation of the surface of the lithium-nickel compound oxide, whereby the safety at the time of overcharging tends to deteriorate. On the other hand, if S/C is too large, the energy density capacity of the cell will decrease. Accordingly, the surface area capacity ratio S/C is at least 0.05, preferably at least 0.1, particularly preferably at least 0.2, and on the other hand, it is at most 5, preferably at most 2, more preferably at most 1.7, particularly preferably at most 1, most preferably at most 0.85. If the surface area capacity ratio S/C is controlled within the above range, the safety at the time of overcharging can be secured without lowering the energy density capacity of the cell.

The cell capacity C of the lithium secondary cell of the present invention is usually at least 1 mAh, preferably at least 10 mAh, and on the other hand, it is usually at most 10 Ah, preferably at most 2000 mAh, more preferably at most 1200 mAh, further preferably at most 1000 mAh, particularly preferably at most 500 mAh. If the cell capacity C is too small, the practical usefulness as a lithium secondary cell will be poor. On the other hand, if the cell capacity C is too large, in some cases overcharging can not be suppressed when an electric current is localized by an influence such as non-uniformity of the electrode. Further, if the capacity is large, the degree of danger (e.g. the degree of explosion or ignition) when a runaway takes place, tends to be large, as the capacity is large. However, basically, the cell capacity C is not particularly limited, and even when the cell capacity C is large, the safety at the time of overcharging can be adequately secured by enlarging the cell surface area S. Namely, in the present invention, the ratio of the cell surface area S contributing to heat release, to the cell capacity C, is specified, whereby it is effective for a lithium secondary cell having any cell capacity C.

In the lithium secondary cell of the present invention, particularly preferred is that the lithium secondary cell has a cell capacity C suitable for a portable electric instrument, for which safety is particularly important.

The cell surface area S of the lithium secondary cell of the present invention is set to be within a predetermined range of the surface area capacity ratio S/C, to the cell capacity C of the lithium secondary cell. The cell surface area S is usually at least 1 $cm^2$, preferably at least 10 $cm^2$, and on the other hand, it is usually at most 10000 $cm^2$, preferably at most 1000 $cm^2$, more preferably at most 200 $cm^2$, further preferably at most 100 $cm^2$, particularly preferably at most 60 $cm^2$. It is preferred to adjust the cell surface area S within the above range, whereby it is practically possible to sufficiently secure the heat release.

Now, with reference to a preferred embodiment of the lithium secondary cell of the present invention, materials constituting the positive electrode other than the above-described positive electrode active material and other materials constituting the lithium secondary cell, will be explained.

Firstly, a specific construction of the lithium secondary cell of the present invention will be explained with reference to FIGS. 1 to 5.

Figure 2:
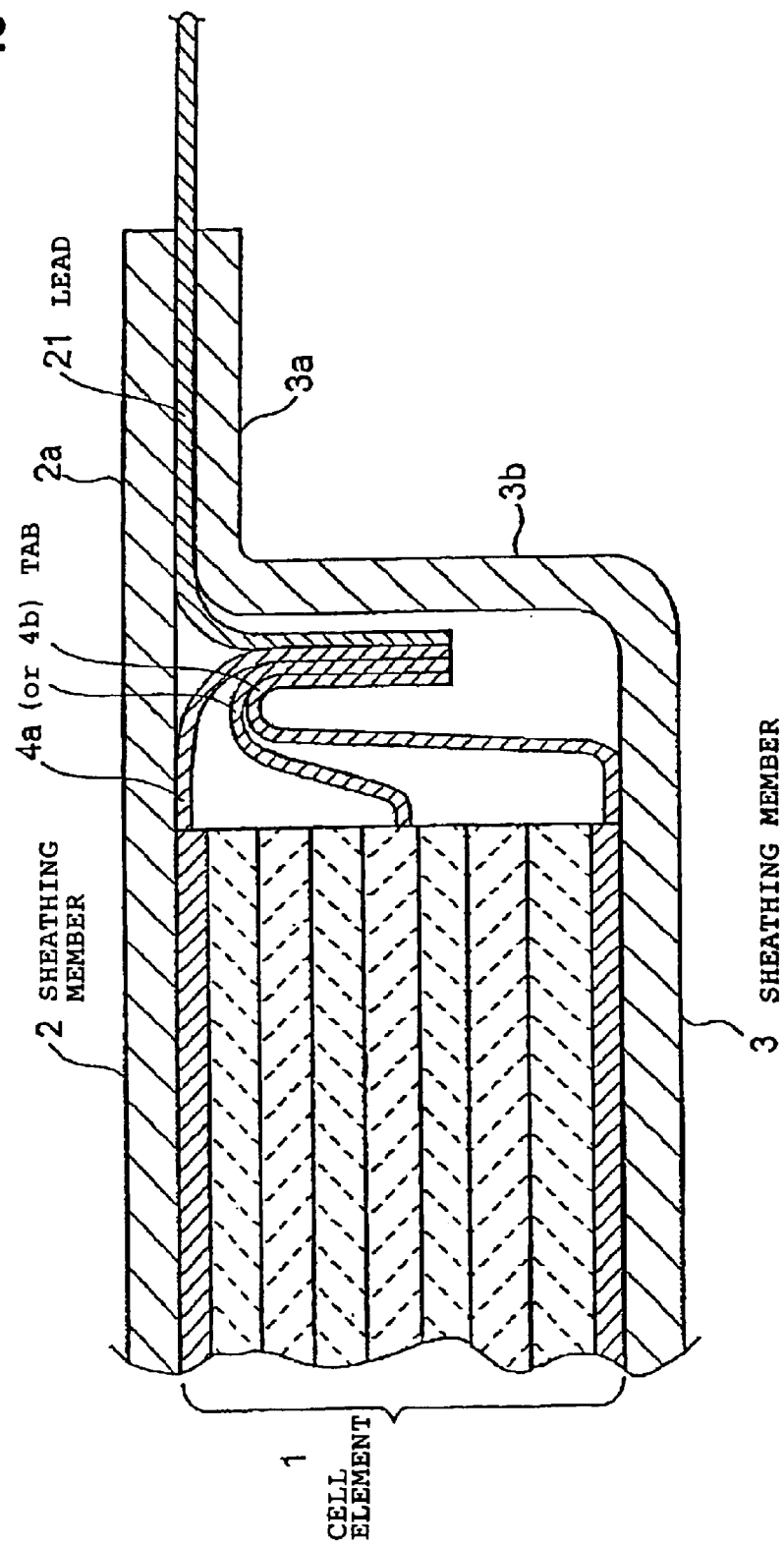
FIG. 2: A cross-sectional view of the essential part of the cell according to the embodiment.
Figure 3:
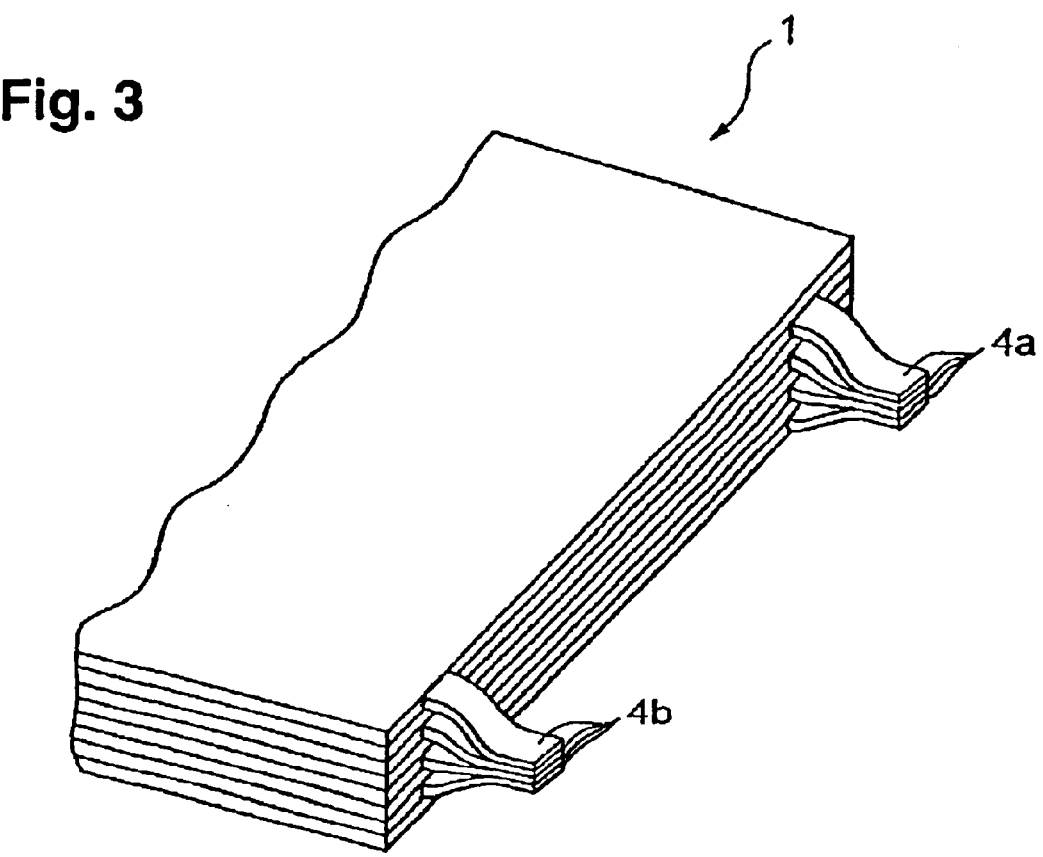
FIG. 3: A general perspective view of a cell element.
Figure 4:
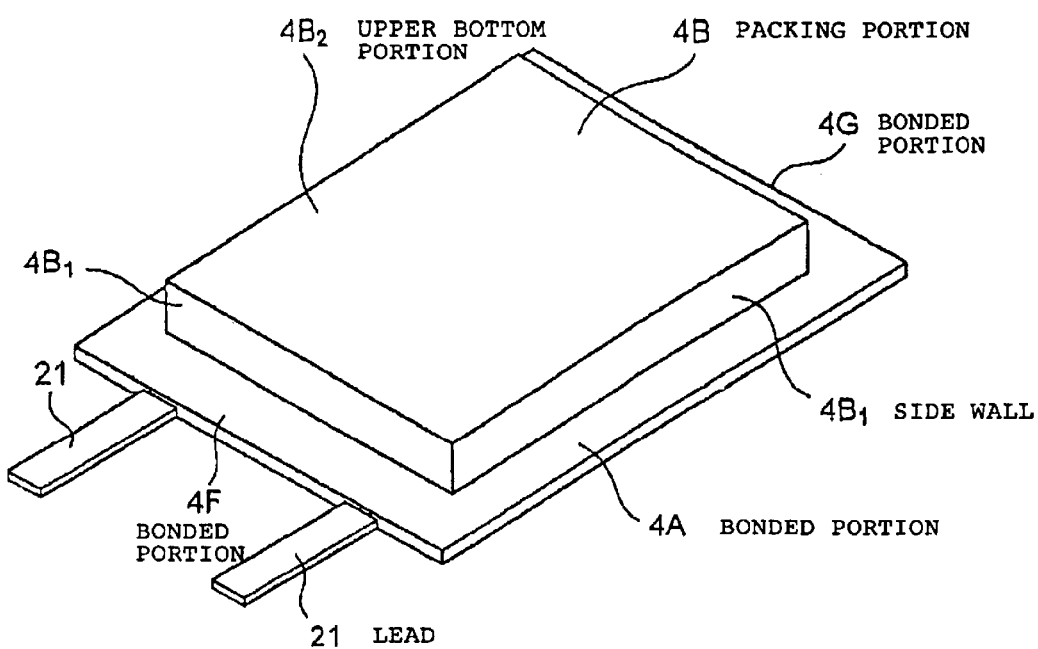
FIG. 4: A perspective view of the cell according to the embodiment (prior to bonding of the bonded portions).
Figure 5:
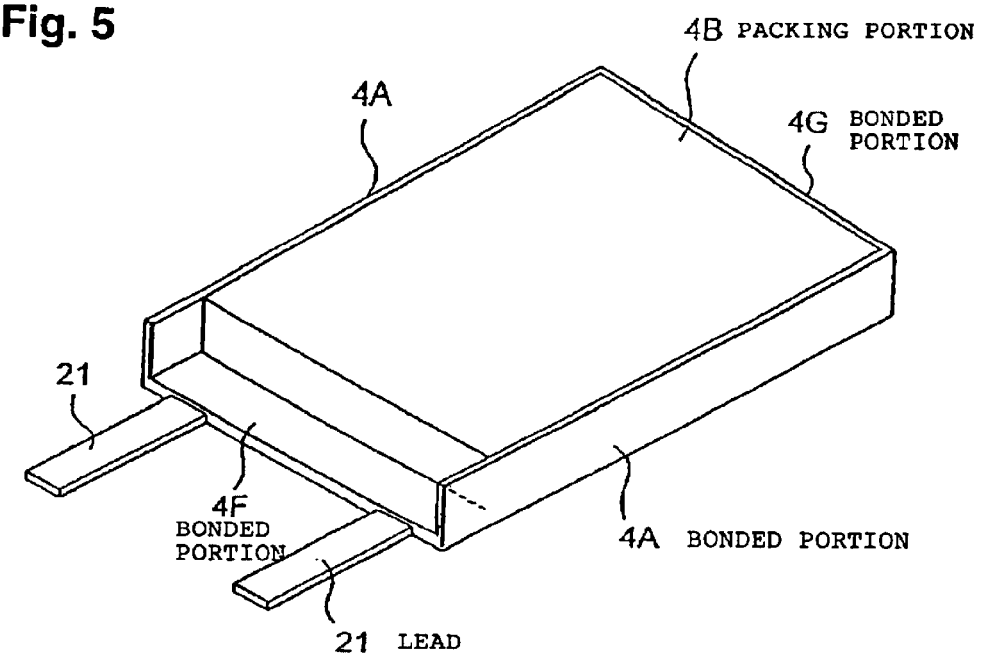
FIG. 5: A perspective view of a cell according to the embodiment (after bonding the bonded portions).

FIG. 1 is an exploded perspective view of the cell of the present embodiment, FIG. 2 is a cross-sectional view of the essential part of the cell, FIG. 3 is a schematic perspective view of the cell element, and FIGS. 4 and 5 are perspective views of the cell. Here, for the sake of convenience for the explanation, the cell disclosed in FIG. 1 is shown up side down in FIGS. 4 and 5.

The lithium secondary cell is one prepared in such a manner that a lithium secondary cell element (in this specification, sometimes referred to simply as "cell element") 1 is accommodated in a recess (receiving portion 3b) of a sheathing member 3, then a sheathing member 2 is covered on the sheathing member 3, and peripheral portions 2a and 3a of the sheathing members 2 and 3, are bonded by vacuum sealing. One obtained by bonding the sheathing members 2 and 3, constitutes a casing which accommodates the cell element 1.

As illustrated in FIG. 1, the sheathing member 2 has a flat plate-shape. The sheathing member 3 is a shallow uncovered box-like member having a receiving portion 3b being a square box form recess, and a peripheral portion 3a flanged outwardly from the four peripheries of this receiving portion 3b.

As illustrated in FIG. 3, the cell element 1 is one having a plurality of unit cell elements stacked. From such a unit cell element, a tab 4a or 4b is led out. Tabs 4a from the respective positive electrodes are bundled one another (namely, stacked one another), and a positive electrode lead 21 is bonded thereto to form a positive electrode terminal. Tabs 4b from the respective negative electrodes are also bundled, and a negative electrode lead 21 is bonded thereto to form a negative electrode terminal.

The cell element 1 is accommodated in the receiving portion 3b of the sheathing member 3, and the sheathing member 2 is put thereon. A pair of leads 21 extending from the cell element 1, are led out to the outside through the mating face of the peripheral portions 2a and 3a on one side of the respective sheathing members 2 and 3. Then, the peripheral portions 2a and 3a of four peripheries of the sheathing members 2 and 3 are bonded to each other for sealing by a method such as thermocompression bonding in a reduced pressure (preferably vacuum) atmosphere, whereby the cell element 1 is sealed in the sheathing members 2 and 3.

By the bonding of the peripheral portions 2a and 3a to each other, a casing comprising the sheathing members 2 and 3 will be constituted. As shown in FIG. 4, this casing comprises an approximately rectangular parallelepiped packing portion 4B packing the cell element 1 by a side wall portion 4B$_1$, an upper bottom portion 4B$_2$ and a lower bottom portion (not shown), and bonded portions 4A, 4F and 4G formed by bonding of the peripheral portions 2a and 3a of the above-mentioned sheathing members to each other.

In the state as disclosed in FIG. 4, the bonded portions 4A, 4A, 4F and 4G flange outwardly from the side wall portion 4B$_1$ of the packing portion 4B packing the cell element 1. Accordingly, as shown in FIG. 5, among these bonded portions, bonded portions 4A, 4A and 4G are folded along the side wall portion 4B$_1$ of the packing portion 4B and fixed and secured to the side wall portion 4B$_1$ of the packing portion 4B by means of e.g. an adhesive or an adhesive tape (not shown).

Further, in the present invention, the proportion occupied by such bonded portions 4A, 4A, 4F and 4G in the cell surface area S, is usually at least 1% and at most 50%, preferably at most 30%, more preferably at most 15%. If this proportion is too large, the capacity of the cell tends to be low, and if it is too small, it is likely that a gas will penetrate into the interior of the casing, or the sealing of the casing will deteriorate.

Figure 6:
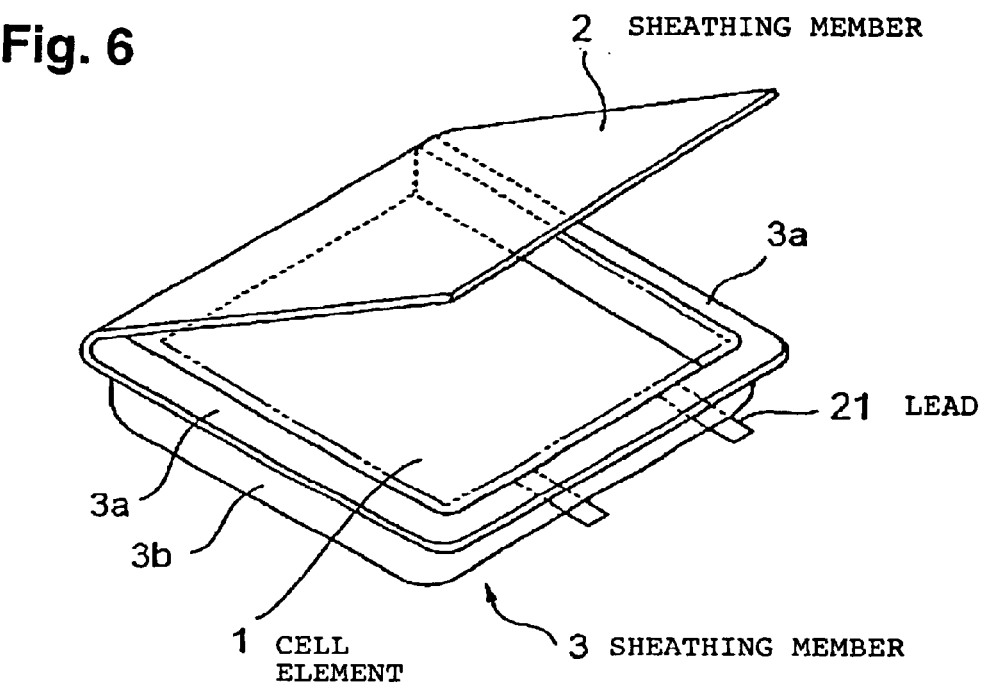
FIG. 6: A perspective view of a cell according to another embodiment in the process of its production.

In FIG. 1, the sheathing members 2 and 3 are separated members. However, in the present invention, the sheathing members 2 and 3 may be continuously unified as shown in FIG. 6. In FIG. 6, one side of the sheathing member 3 and one side of the sheathing member 2 are joined, whereby the sheathing member 2 forms a shape of cover plate foldable against the sheathing member 3. The recess of the receiving portion 3b is formed starting from one side where the sheathing members 2 and 3 are joined, and on this one side, the construction is the same as the bonded portions except that no bonded portion is formed. And, one having such sheathing members 2 and 3 bonded to each other, will be the casing to accommodate the cell element 1.

Figure 7:
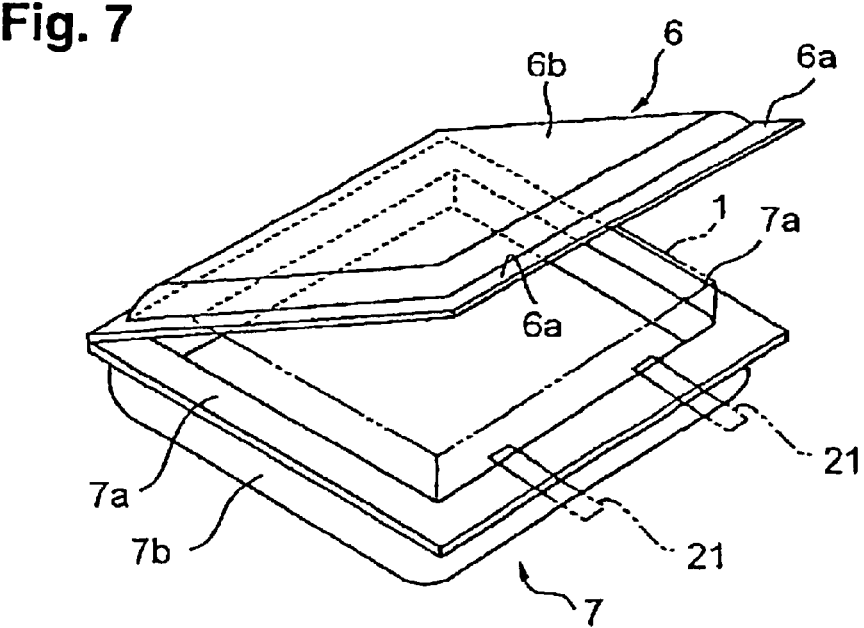
FIG. 7: A perspective view of a cell according to still another embodiment in the process for its production.

In FIGS. 1 and 6, the sheathing member 3 having the receiving portion 3b, and the sheathing member 2 being a flat plate are illustrated. However, in the present invention, as shown in FIG. 7, the cell element 1 may be packed by sheathing members 6 and 7, having shallow box-form receiving portions 6b and 7b, respectively, and having peripheral portions 6a and 7a flanged outwardly from the receiving portions 6b and 7b, respectively. In FIG. 7, the sheathing members 6 and 7 are continuously unified. However, these may be separated in the same manner as in FIG. 1. And, one having such sheathing members 6 and 7 bonded to each other, will be the casing to accommodate the cell element 1.

Figure 8:
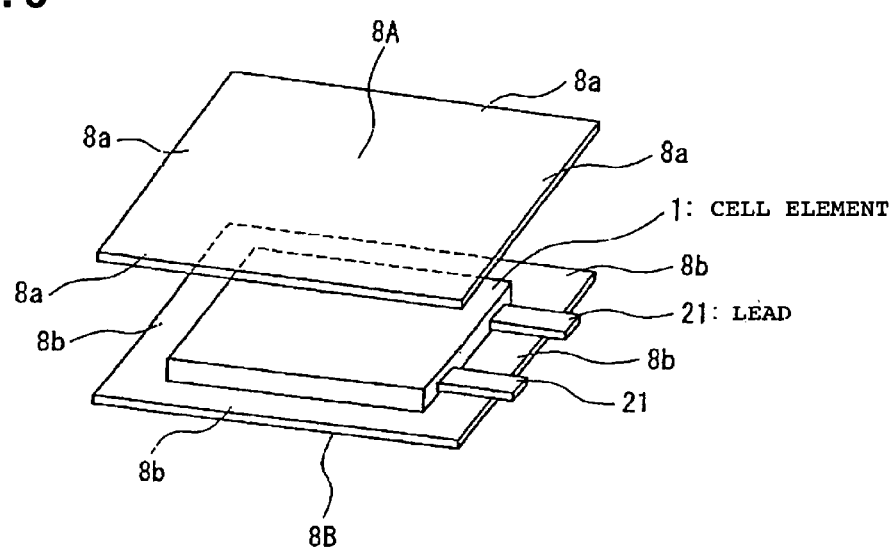
FIG. 8: A perspective view of a cell according to a further different embodiment in the process for its production.
Figure 9:
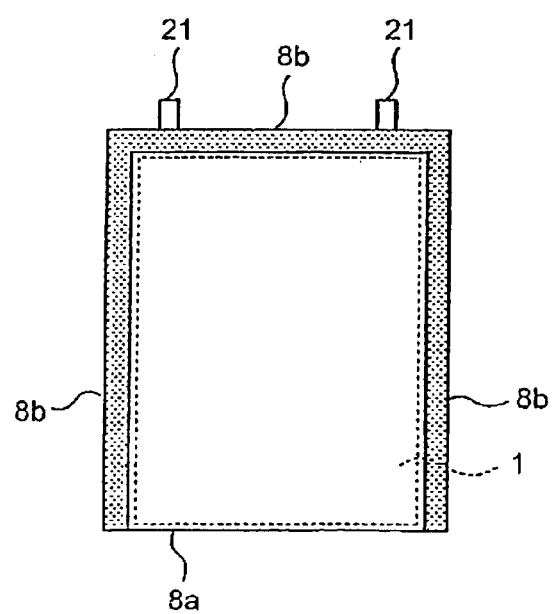
FIG. 9: A plan view of the cell in FIG. 8 in the process for its production.

In the present invention, as shown in FIG. 8, the cell element 1 may be interposed between a pair of flat sheet-form sheathing members 8A and 8B, and, as shown in FIG. 9, the peripheral portion 8a of the sheathing member 8A and the peripheral portion 8b of the sheathing member 8B may be bonded to each other to seal in the cell element 1. In such a case, one having such sheathing members 8A and 8B to each other, will be the casing to accommodate the cell element 1.

Further, as shown in FIG. 5, in such an embodiment, the folded bonded portions are fixed and secured to the packing portion by means of an adhesive or an adhesive tape, whereby the strength and rigidity of the side surface of the cell will be high. Of course, separation of the folded bonded portions from the packing portion will also be prevented. Further, since the strength and rigidity of the side surface of the cell are high, peeling of the active material will also be prevented, even when the side surface receives a shock.

Figure 10:
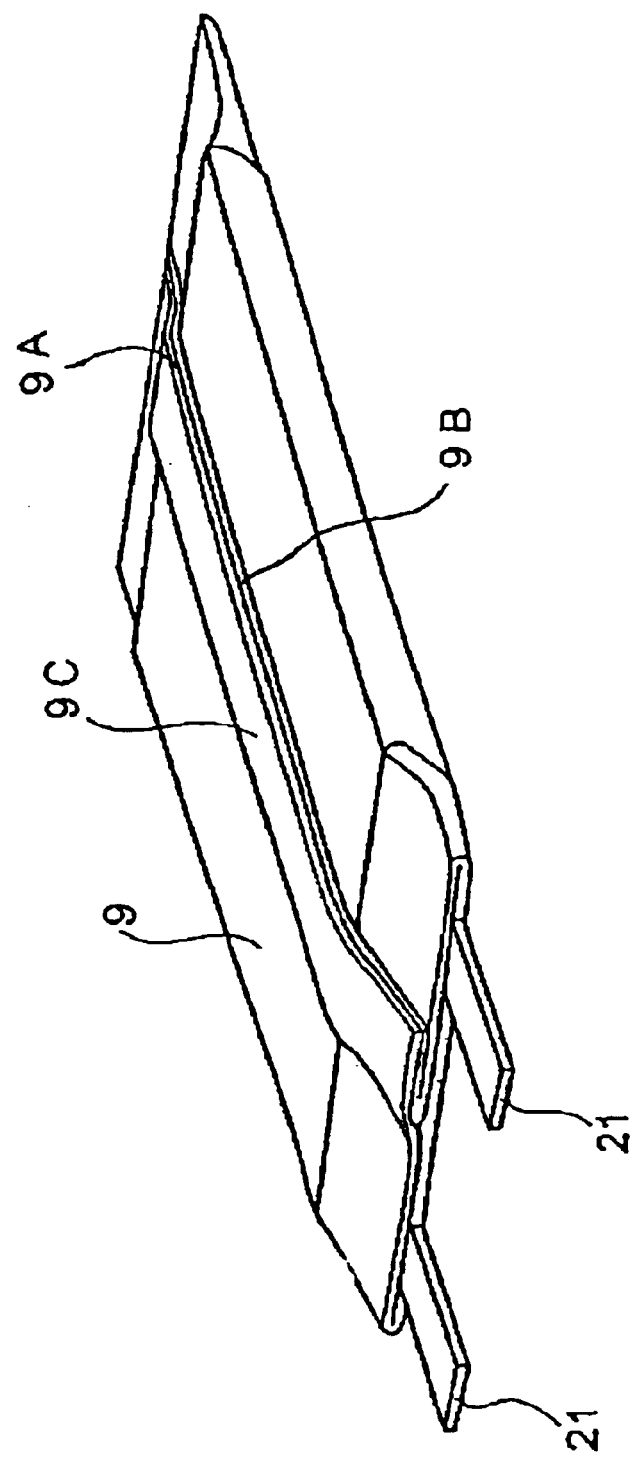
FIG. 10: A perspective view of a cell according to another embodiment.

The cell of the present invention may be otherwise formed as shown in FIG. 10, i.e. a single long sheet-form sheathing member 9 is put around a cell element to cover it in such a state that a lead 21 is led out, both ends 9A and 9B of the sheathing member 9 are put together and folded, and this folded portion 9C may be fixed by means of an adhesive or an adhesive tape. And, by fixing the folded portion 9C, a casing made of the sheathing member 9 will be formed.

In any one of the above-mentioned cells, by using a laminated film in which the gas barrier layer and a resin layer are directly laminated without an adhesive layer, it is possible to obtain a high moisture-permeation-preventing effect, and it is possible to maintain the cell performance of the internal non-aqueous type cell element constantly over a long period of time.

Further, in either one of the constructions, the proportion of the area of the bonded or folded portion of the cell casing is usually at least 1% and at most 50%, preferably at most 30%, more preferably at most 20%, particularly preferably at most 15%, based on the cell surface area S for the above-mentioned reason. In the following, the proportion of the area of the bonded portions of the casing, based on the cell surface area S may sometimes be referred to as a "bonded portion area proportion".

Now, the construction of a lithium secondary cell element will be described with reference to FIGS. 11 to 13.

Figure 11:
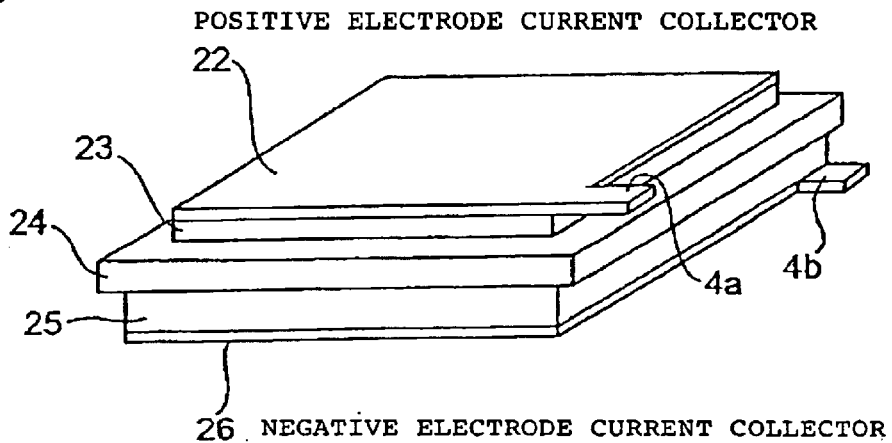
FIG. 11: A schematic perspective view of a unit cell element.

FIG. 11 illustrates a preferred example of the unit cell element for the lithium secondary cell element. The unit cell element comprises a positive electrode current collector 22, a positive electrode active material layer 23, a spacer (electrolyte layer) 24, a negative electrode active material layer 25 and a negative electrode current collector 26, laminated one another.

In a preferred embodiment of the present invention, the lithium secondary cell element is formed by stacking a plurality of unit cell elements as shown in FIG. 11. In such stacking, a unit cell element in the regular position (FIG. 11) having the positive electrode on the top side and the negative electrode on the bottom side, and a unit cell element in the reversed position (figure is omitted) having reversely the positive electrode on the bottom side and the negative electrode on the top side, are stacked alternately. Namely, they are stacked so that in the unit cell elements adjacent in the stacked direction, the same electrodes (namely, positive electrode and positive electrode, or negative electrode and negative electrode) face each other.

In this unit cell element, the positive electrode current collector 22 is provided with a positive electrode tab 4a extending therefrom, and the negative electrode current collector 26 is provided with a negative electrode tab 4b extending therefrom.

Figure 12:
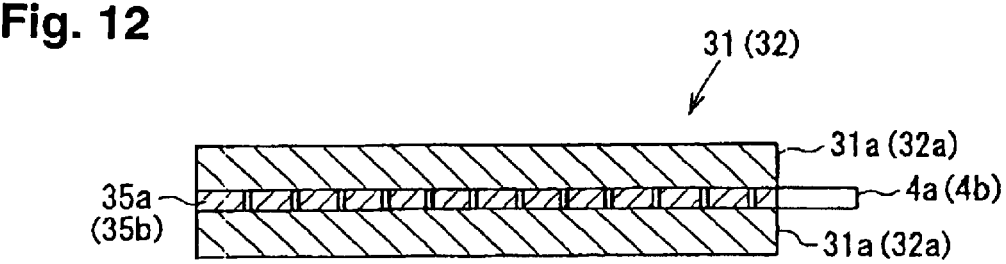
FIG. 12: A schematic cross-sectional view of a positive electrode or a negative electrode.
Figure 13:
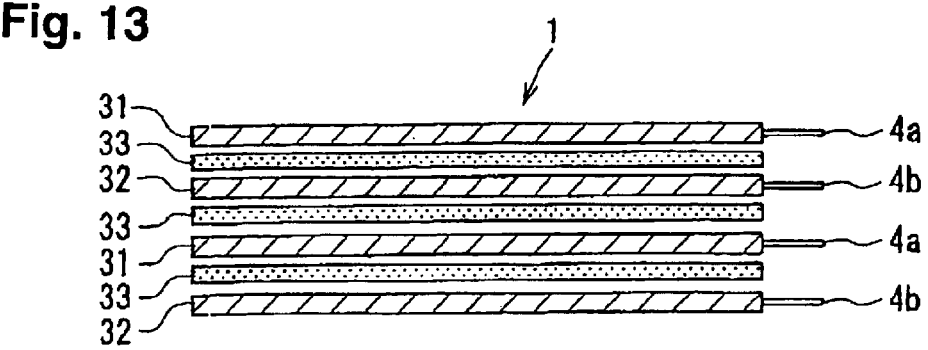
FIG. 13: A schematic cross-sectional view of a cell element.

Instead of the unit cell element which comprises a positive electrode active material layer, a spacer and a negative electrode active material layer laminated between a positive electrode current collector and a negative electrode current collector as illustrated in FIG. 11, the unit cell element may be such that, as illustrated in FIG. 12, on both sides of a positive electrode current collector 35a or a negative electrode current collector 35b as a core member, positive electrode active material layers 31a or negative electrode active material layers 32a are laminated to form a positive electrode 31 or a negative electrode 32, and then, such a positive electrode 31 and such a negative electrode 32 are laminated alternately via a spacer (electrolyte layer) 33 as illustrated in FIG. 13 to form a unit cell element. In this case, the combination of a pair of the positive electrode 31 and the negative electrode 32 (strictly speaking, from the center in the direction of the thickness of the current collector 35a of the positive electrode 31, to the center in the direction of the thickness of the current collector 35b of the negative electrode 32) corresponds to a unit cell element.

For the positive current collector 35a or 22, various metals such as aluminum, nickel and SUS, may be used, but preferred is aluminum.

On the other hand, for the negative electrode current collector 35b or 26, various metals such as copper, nickel and SUS may be used, but preferred is copper.

The thickness of each of the positive electrode current collector and the negative electrode current collector (in this specification, the positive electrode current collector and the negative electrode current collector may generally be referred to simply as a current collector) is usually at least 1 $\mu$m, preferably at least 3 $\mu$m, more preferably at least 5 $\mu$m, and it is usually at most 30 $\mu$m, preferably at most 25 $\mu$m, more preferably at most 20 $\mu$m. The thinner the current collector, the better from the viewpoint of the volume energy density and the weight energy density. However, if it is too thin, its handling tends to be difficult from the viewpoint of e.g. the strength. The current collector may be in a plate-form such as a usual metal foil or in a mesh-form such as punching metal. The surface of the current collector may be subjected to surface roughening treatment in advance, as the case requires.

The positive electrode active material layer and the negative electrode active material layer (in this specification, the positive electrode active material layer and the negative electrode active material layer may generally be referred to simply as an active material layer) contain a positive electrode active material and a negative electrode active material (in this specification, the positive electrode active material and the negative electrode active material may generally be referred to simply as an active material), respectively. As other materials to be contained in the active material layer, a binder and a conductive material may, for example, be mentioned.

The positive electrode active material is as described above.

As an active material useful for the negative electrode, besides metal lithium, various compounds capable of absorbing and desorbing lithium, may be used. Specifically, metal lithium; a lithium alloy such as a lithium-aluminum alloy, a lithium-bismuth-cadmium alloy or a lithium-tin-cadmium alloy; or a carbon material such as graphite or coke, may, for example, be mentioned. Further, an oxide of e.g. silicon, tin, zinc, manganese, iron or nickel, or lead sulfate, may be used. If the metal lithium or the lithium alloy is used, a dendrite tends to be formed at the time of charging, and accordingly the safety tends to decrease, especially at the time of overcharging. Therefore, a carbon material such as graphite or coke is preferred. The average particle diameter of the negative electrode active material may be usually from 1 to 50 $\mu$m, preferably from 15 to 30 $\mu$m, from the viewpoint of the cell characteristics such as the initial characteristics, the rate characteristics or the cycle characteristics.

It is preferred to use a binder to bind such a positive electrode material and a negative electrode material on the current collector. The binder to be used needs to be stable against e.g. the electrolytic solution, and is desired to have weatherability, chemical resistance, heat resistance, flame resistance, etc. As the binder, an inorganic compound such as a silicate or glass, or various resins made mainly of polymers, may be used. As the resins, for example, an alkane type polymer such as polyethylene, polypropylene or poly-1,1-dimethylethylene; an unsaturated type polymer such as polybutadiene or polyisoprene; a polymer having a ring such as polystyrene, polymethylstyrene, polyvinyl pyridine or poly-N-vinyl pyrrolidone; an acryl type polymer such as polymethyl methacrylate, polyethyl methacrylate, polybutyl methacrylate, polymethyl acrylate, polyethyl acrylate, polyacrylic acid, polymethacrylic acid or polyacrylamide; a fluorine type resin such as polyvinyl fluoride, polyvinylidene fluoride or polytetrafluoroethylene; a CN group-containing polymer such as polyacrylonitrile or polyvinylidene cyanide; a polyvinyl alcohol type polymer such as polyvinyl acetate or polyvinyl alcohol; a halogen-containing polymer such as polyvinyl chloride or polyvinylidene chloride; and a conductive polymer such as polyaniline, may be used. Further, e.g. mixtures, modified products, derivatives, random copolymers, alternate copolymers, graft-copolymers or block copolymers of the above-mentioned polymers, may also be used. The molecular weights of these resins are preferably from 10000 to 3000000, more preferably from 100000 to 1000000. If the molecular weight is smaller than this range, the strength of the active material layer tends to decrease, and if it is larger, the viscosity tends to be high and it will be difficult to form an electrode.

The amount of incorporation of the binder is preferably from 0.1 to 30 parts by weight, more preferably from 1 to 20 parts by weight, based on 100 parts by weight of the active material. If the amount of the binder is too small, the strength of the electrode lo may decrease, and if it is too large, the capacity tends to decrease, and the ionic conductivity tends to be low.

In the positive electrode active material layer or the negative electrode active material layer, an additive, a powder or a filler to provide various functions, such as a conductive material or a reinforcing material, may be contained as the case requires.

As the conductive material, there is no particular restriction so long as it can impart electrical conductivity when mixed to the above-mentioned active material in an appropriate amount, and it may usually be a carbon powder such as acetylene black, carbon black or graphite, or a fiber or foil of various metals. The DBP oil absorption of such a carbon powder is preferably at least 120 cc/100 g, particularly preferably at least 150 cc/100 g, for holding the electrolytic solution. As the additive, trifluoropropylene carbonate, vinylene carbonate, 1,6-dioxaspiro[4,4]nonane-2,7-dione or 12-crown-4-ether may, for example, be used to increase the stability or life of the cell. As the reinforcing material, various inorganic or organic spherical or fibrous fillers, etc. may be used.

As a method for forming an active material layer on a current collector, a method may, for example, be used suitably in which a powdery active material is mixed with a binder in a solvent and dispersed by means of a ball mill, a sand mill or a twin screw kneader to obtain a coating material, which is then coated on a current collector, followed by drying. In such a case, the type of the solvent to be used, is not particularly limited so long as it is inactive to the electrode material and is capable of dissolving the binder. For example, any inorganic or organic solvent which is commonly used, such as N-methylpyrrolidone, may be used. After the coating, the active material layer may be subjected to compaction treatment. Here, by controlling e.g. the composition of the coating material, the drying conditions or the compaction conditions, it is possible to control the volume percentage of the binder in the active material layer.

The active material layer may also be formed by a method in which an active material is mixed with a binder and heated and in such a softened state, press-bonded or sprayed to a current collector to form an active material layer. Further, the active material layer may also be formed by baking the active material alone to a current collector.

The thickness of the active material layer of the positive electrode or the negative electrode should better be thick from the viewpoint of increasing the capacity, but should better be thin from the viewpoint of improving the rate characteristics. The thickness of the active material layer is usually at least 20 $\mu$m, preferably at least 30 $\mu$m, more preferably at least 50 $\mu$m, most preferably at least 80 $\mu$m. The thickness of the active material layer is usually at most 200 $\mu$m, preferably at most 150 $\mu$m.

Further, prior to forming the active material layer, an undercoat primer layer may be provided between the active material layer and the current collector in order to improve the adhesion between them, as the case requires.

When the undercoat primer layer is provided, its composition may, for example, be a resin having conductive particles of e.g. carbon black, graphite or metal powder, incorporated, or an organic conjugate type resin having electrical conductivity. It is preferred to use, as the conductive particles, carbon black or graphite, which can also work as an active material. Further, it is preferred to use, as the resin, polyaniline, polypyrrole, polyacene, a disulfide type compound or a polysulfide type compound, which can work also as an active material, since it is thereby possible to prevent reduction of the capacity. In the case of a composition containing a resin having the conductive particles incorporated, as the main component, the proportion of the resin based on the conductive particles is preferably from 1 to 300 wt %, particularly preferably from 5 to 100 wt %. If the proportion of the resin is less than this range, the film strength tends to be low, and during the use of the cell or during the production process, peeling or the like may result, and if it is too high, the electroconductivity tends to decrease, whereby the cell characteristics tend to deteriorate. The film thickness of the undercoat primer layer is usually from 0.05 to 10 $\mu$m, preferably from 0.1 to 1 $\mu$m. If this film thickness is too thin, coating tends to be difficult, and it will be difficult to secure uniformity. If the film thickness is too thick, the volume capacity of the cell tends to be lost more than necessary, such being undesirable.

Spacers (electrolyte layers) 33 and 24 are usually impregnated with electrolytic solutions having fluidity, or with various electrolytes such as gel electrolytes, or non-fluid electrolytes such as a completely solid type electrolyte. Such an electrolyte is impregnated not only in a spacer but also in the positive electrode active material layer and in the negative electrode active material layer. If the electrolyte is sufficiently impregnated in the spacer, the positive electrode active material layer and the negative electrode active material layer, diffusion of lithium ions will be accelerated, whereby the cell performance will be improved. As such an electrolyte, from the characteristics of the cell, it is preferred to use an electrolytic solution or a gel-form electrolyte among non-fluid electrolytes, and from the safety, a non-fluid electrolyte is preferred.

In the present invention, it is preferred to use a non-fluid electrolyte as the electrolyte. When a non-fluid electrolyte is used, the electrolyte will not flow out of the unit cell element at the time of overcharging, and the thermal storage of the cell will be facilitated without impairing the thermal conductivity, whereby the effect of the present invention to promote heat release at the time of overcharging can be obtained to the maximum extent. Further, the possibility of dissolving the surface layer of the deactivated lithium-nickel compound oxide is low, whereby the possibility that a surface having a high reactivity continuously appears, is low, and the effect of the present invention to positively deactivate the surface of the lithium-nickel compound oxide at the time of overcharging, can be certainly obtained. Further, when a non-fluid electrolyte is used, liquid leakage may be prevented more effectively in comparison with a cell using a conventional electrolytic solution, whereby the after-mentioned merit of using a casing having a variable shape such as a laminated film, can be used to the maximum extent.

On the other hand, an electrolytic solution having a lithium salt dissolved in a non-aqueous solvent has high fluidity and usually tends to be excellent in ion conductivity as compared with a non-fluid electrolyte. Accordingly, it is preferred to use an electrolytic solution as the electrolyte with a view to improving the ion conductivity.

The electrolytic solution used as the electrolyte usually has a lithium salt as a supporting electrolyte, dissolved in a non-aqueous solvent. As the non-aqueous solvent, a solvent having a relatively high dielectric constant is preferably used. Specifically, a cyclic carbonate such as ethylene carbonate or propylene carbonate, a non-cyclic carbonate such as dimethyl carbonate, diethyl carbonate or ethylmethyl carbonate, an ether such as tetrahydrofuran, 2-ethyltetrahydrofuran or dimethoxyethane, a lactone such as γ-butyrolactone, a sulfur compound such as sulfolane or a nitrile such as acetonitrile, may, for example, be mentioned. A cyclic carbonate and/or lactone is preferred from the viewpoint of the cell characteristics such as the cycle characteristics, the rate characteristics and the safety.

In the present invention, it is preferred to use, as a solvent for the electrolytic solution, a non-aqueous solvent having a boiling point of at least 150° C. under the atmospheric pressure (hereinafter it may sometimes be referred to as a high boiling point solvent). Here, "a boiling point of at least X° C." means that the vapor pressure does not exceed 1 atm even when heated from the room temperature to X° C. under a pressure of 1 atm. Namely, it is preferred to use a non-aqueous solvent which always has a vapor pressure of at most 1 atm when it is heated from room temperature to 150° C. under a pressure of 1 atm. As a result, it is possible to obtain higher cycle characteristics and to improve the safety of the cell. For example, if a low boiling point solvent composed of such a solvent as dimethylcarbonate, diethylcarbonate or dimethoxyethane, is used, bubbles due to evaporation of the solvent will be generated between the active material and the solvent, whereby the impregnation state of the electrolytic solution will be low, the interface tends to be non-uniform, and the cycle characteristics are likely to deteriorate.

By using a high boiling point solvent, even if the cell element is accommodated in the variable shape casing, it is possible to suppress a change of the shape (deformation) of the cell e.g. at high temperature, or evaporation or leakage of the electrolytic solution and the like. Such a high boiling point solvent may, for example, be propylene carbonate, ethylene carbonate, butylene carbonate, or γ-butyrolactone. Among such high boiling point solvents, preferred is propylene carbonate, ethylene carbonate or γ-butyrolactone.

Further, in such a case, the boiling point is defined with respect to the entire solvent to be used. Namely, when a plurality of non-aqueous solvents are used, it is not meant that the boiling point of each solvent is at least 150° C., but it is meant that the boiling point of the mixed entire solvent is at least 150° C.

Further, the non-aqueous solvent preferably has a viscosity of at least 1 mPa·s.

Among these non-aqueous solvents, in the present invention, it is particularly preferred to use a solvent containing propylene carbonate. Namely, propylene carbonate has a high boiling point, and thus it is safe and hardly solidified and has good low temperature characteristics. On the other hand, propylene carbonate has secondary carbon and is likely to be oxidized at the surface of the lithium-nickel compound oxide. Therefore, deactivation of the lithium-nickel compound oxide will be facilitated, whereby when propylene carbonate is used, the effect of the present invention will be more distinct.

The lithium salt as a supporting electrolyte to be dissolved in a non-aqueous solvent such as propylene carbonate, may, for example, be $LiPF_6$, $LiAsF_6$, $LiSbF_6$, $LiBF_4$, $LiClO_4$, LiI, LiBr, LiCl, $LiAlCl$, $LiHF_2$, LiSCN or $LiSO_3CF_2$. Among these, $LiPF_6$ and $LiClO_4$ are particularly preferred. The concentration of such a supporting electrolyte in the electrolytic solution is usually from 0.5 to 2.5 mol/L.

From such an electrolytic solution and a polymer for forming a gel, a gelled electrolyte as one of non-fluid electrolytes can be constituted. The gelled electrolyte usually comprises the above-mentioned electrolytic solution and a polymer holding it. The gelled electrolyte can impart an ionic conductivity substantially equivalent to that of the electrolytic solution, and makes the electrolyte to be non-fluid, and thus, it is a particularly preferred electrolyte in the present invention.

The concentration of the polymer based on the electrolytic solution in the gelled electrolyte, may depend on the molecular weight of the polymer used, but is usually from 0.1 to 30 wt %. If the concentration is too low, it tends to be difficult to form a gel, and the capability to hold the electrolytic solution lowers, whereby a problem of flowage or leakage may occur. If the concentration is too high, not only the viscosity becomes so high that a difficulty in the production process occurs, but also the proportion of the electrolytic solution lowers, and the ionic conductivity lowers, whereby the cell characteristics such as the rate characteristics tend to be low accordingly. As the polymers for holding the electrolyte, various polymers having a function of gelling the electrolyte, such as a poly(meth)acrylate type polymer, an alkylene oxide type polymer having alkylene oxide units, or a fluoropolymer such as a polyvinylidene fluoride or a vinylidene fluoride-hexafluoropropylene copolymer, may be mentioned.

As a method of forming the gelled electrolyte, a material/method as the case requires, may be employed, such as a method of applying solidification treatment to an electrolyte precursor solution having a polymer preliminarily dissolved in an electrolytic solution, or a method of subjecting an electrolyte precursor solution having a polymerizable gelling agent incorporated in an electrolytic solution to a cross-linking reaction to form an non-fluid electrolyte.

In the case of carrying out the forming of the gelled electrolyte by subjecting the coating material having a polymerizable gelling agent incorporated in an electrolytic solution to a cross-linking reaction, a monomer capable of forming a polymer when subjected to polymerizing treatment such as ultraviolet ray curing or thermosetting, is added as a polymerizable gelling agent, to the electrolytic solution, to obtain a coating material.

The polymerizable gelling agent may, for example, be one having an unsaturated double bond such as an acryloyl group, a methacryloyl group, a vinyl group or an allyl group. Specifically, for example, acrylic acid, methyl acrylate, ethyl acrylate, ethoxyethyl acrylate, methoxyethyl acrylate, ethoxyethoxyethyl acrylate, polyethylene glycol monoacrylate, ethoxyethyl methacrylate, methoxyethyl methacrylate, ethoxyethoxyethyl methacrylate, polyethylene glycol monomethacrylate, N,N-diethylaminoethyl acrylate, N,N-dimethylaminoethyl acrylate, glycidyl acrylate, allyl acrylate, acrylonitrile, N-vinyl pyrrolidone, diethylene glycol diacrylate, triethylene glycol diacrylate, tetraethylene glycol diacrylate, polyethylene glycol diacrylate, diethylene glycol dimethacrylate, triethylene glycol dimethacrylate, tetraethylene glycol dimethacrylate, polyethylene glycol dimethacrylate, polyalkylene glycol diacrylate, polyalkylene glycol dimethacrylate, trimethylol propane alkoxylate triacrylate, pentaerythritol alkoxylate triacrylate, pentaerythritol alkoxylate tetraacrylate or ditrimethylol propane alkoxylate tetraacrylate may, for example, be mentioned. These may be used alone, or a plurality of these may be used in combination. Among these, particularly preferred is a diacrylate or a triacrylate each containing a plurality of ethylene oxide groups.

The content of the polymerizable gelling agent in the electrolytic solution is not particularly restricted, and preferably at least 1 wt %. If the content is low, the efficiency of forming the polymer lowers and it becomes difficult to solidify the electrolytic solution. On the other hand, if the content is too high, an unreacted polymerizable gelling agent remains and the handling efficiency as an electrolyte precursor solution deteriorates. Therefore, it is usually at most 30 wt %.

In the case of forming the gelled electrolyte by the method of solidifying the electrolyte precursor solution having a polymer incorporated in advance, it is preferred to use, as the polymer, a polymer soluble in the electrolytic solution at high temperature and capable of forming a gelled electrolyte at room temperature. Namely, the gelled electrolyte is obtained by bringing the polymer dissolved in the electrolytic solution at high temperature, to the room temperature. Such a high temperature is usually from 50 to 200° C., preferably from 100 to 160° C. If the polymer is dissolved at too low temperature, the stability of the gelled electrolyte lowers. If the dissolution temperature is too high, decomposition of e.g. the electrolytic solution component or the polymer may be induced. As a method of solidifying, it is preferred to leave the electrolytic solution at room temperature. However, forced cooling may also be used.

As a useful polymer in this method, for example, a polymer having a ring such as polyvinyl pyridine or poly-N-vinyl pyrrolidone; an acryl derivative polymer such as polymethyl methacrylate, polyethyl methacrylate, polybutyl methacrylate, polymethyl acrylate, polyethyl acrylate, polyacrylic acid, polymethacrylic acid or polyacrylamide; a fluoro-resin such as polyvinyl fluoride or polyvinylidene fluoride; a CN group-containing polymer such as polyacrylonitrile or polyvinylidene cyanide; a polyvinyl alcohol type polymer such as polyvinyl acetate or polyvinyl alcohol; a halogen-containing polymer such as polyvinyl chloride or polyvinylidene chloride, may be mentioned. Among these, it is preferred to use polymethyl methacrylate, polyacrylonitrile, polyethylene oxide or a modified product thereof. Mixtures, converted materials, derivatives, random copolymers, alternate copolymers, graft-copolymers, block copolymers, etc. of the above-mentioned polymers, may also be used. The weight average molecular weight of such a polymer is preferably in the range of from 10000 to 5000000. If the molecular weight is low, the gel tends to hardly form, and if the molecular weight is high, the viscosity becomes too high and the handling becomes difficult.

Among these methods to form the gelled electrolyte, the method of subjecting the electrolyte precursor solution having a polymerizable gelling agent incorporated in the electrolytic solution to a cross-linking reaction to form a non-fluid electrolyte, is preferred, since it improves the adhesion between the electrodes, whereby the effect of the present invention becomes especially remarkable.

In the electrolyte, various additives can be incorporated in order to improve the performance of the cell, as the case requires. As an additive for exhibiting such a function, there is no particular restriction, and for example, trifluoropropylene carbonate, 1,6-dioxaspiro[4,4]nonane-2,7-dione, 12-crown-4-ether, vinylene carbonate, catechol carbonate, dimethylsulfone, propanesultone, sulfolene, sulfolane or succinic anhydride, may be mentioned.

In the present invention, it is preferred that a compound represented by the following formula (1) is present in the lithium secondary cell element.

$$A1\text{-}X\text{-}A2 \qquad (1)$$

In the above formula (1), X is a Group VI element in the periodic table. The Group VI element in the periodic table specifically means oxygen, sulfur, selenium, tellurium or polonium, preferably oxygen or sulfur, more preferably oxygen. Each of A1 and A2 which are independent of each other, is a group having an aromatic ring, such as a phenyl group, a naphthyl group or an anthryl group. It is preferably a phenyl group or a naphthyl group, more preferably a phenyl group. In this case, a part of hydrogen atoms of the aromatic ring may be substituted by a substituent such as a linear, branched or cyclic alkyl group, a linear, branched or cyclic alkenyl group, an aryl group, a hetero ring group, an alkoxy group, an aryloxy group, a hetero ring-oxy group or a halogen atom. Here, the number of carbon atoms in the linear, branched or cyclic alkyl group, the linear, branched or cyclic alkenyl group, the aryl group, the hetero ring group, the alkoxy group, the aryloxy group or the hetero ring oxy group, to be used as the substituent, is preferably at most 15, more preferably at most 10, most preferably at most 5. Further, a hydrogen atom bonded to the linear, branched or cyclic alkyl group, the linear, branched or cyclic alkenyl group, the aryl group, the hetero ring group, the alkoxy group, the aryloxy group and the hetero ring oxy group, may be substituted by a halogen atom.

As a specific substituent, the linear, branched or cyclic alkyl group may, for example, be a methyl group, an ethyl group, a n-propyl group, an i-propyl group, a n-butyl group, a sec-butyl group, a t-butyl group, a n-pentyl group, a n-hexyl group, a cyclopropyl group, a cyclobutyl group, a cyclopentyl group or a cyclohexyl group. Further, the linear, branched or cyclic alkenyl group which can be used as the substituent, may, for example, be a vinyl group, a propenyl group, a butenyl group or a hexenyl group. Further, the aryl group which can be used as the substituent, may, for example, be a phenyl group or a naphthyl group. Further, the hetero ring group which can be used as the substituent, may, for example, be a pyridyl group, a thiazolyl group, a benzothiazolyl group, an oxazolyl group, a benzoxazolyl group or a benzofuranyl group. Still further, the alkoxy group which can be used as the substituent, may, for example, be a methoxy group, an ethoxy group, a n-propoxy group, an i-propoxy group or a n-butoxy group. Further, the aryloxy group which can be used as the substituent, may, for example, be a phenoxy group or a naphthyloxy group. Still further, the hetero ring oxy group which can be used as the substituent, may, for example, be a pyridyloxy group, a furyloxy group or a thiazolyloxy group. Further, the halogen atom which can be used as the substituent, may, for example, be fluorine, chlorine or bromine.

Further, A1 and A2 may be connected to each other to constitute a ring. Namely, A1 and A2 are bonded to each other via element X, but in addition to this bond, A1 and A2 may be bonded directly or via a single or plural atoms to form, as a whole, a ring containing element X.

The boiling point of the compound of the formula (1) under atmospheric pressure, is usually at least 100° C., preferably at least 120° C., more preferably at least 150° C. If the boiling point is low, the pressure in the interior of the casing having a variable shape is likely to increase by vaporization, whereby the cell is likely to be swelled and deformed. Especially under a high temperature environment, swelling is likely to take place at the time of overcharging. Accordingly, the boiling point is preferably as high as possible from the viewpoint of securing the high temperature storage characteristics of the cell and the safety against overcharging. However, it is practically difficult to obtain a compound having a so high boiling point, and the boiling point is usually at most 300° C.

Specific examples of the compound of the formula (1) include phenyl ether, naphthyl ether, diphenyl sulfide, bis(p-tolyl) ether, bis(p-tolyl) sulfide, bis(p-fluorophenyl) ether, bis(p-fluorophenyl) sulfide, bis(p-chlorophenyl) ether, diphenoxybenzene, dibenzofuran, 1,4-dibenzodioxane and xanthene. Among them, phenyl ether, diphenyl sulfide or dibenzofuran is particularly preferred, and phenyl ether is most preferred. Of course, plural types of the compound of the formula (1) may be used in combination.

By letting the compound of the above formula (1) be present in the lithium secondary cell element, it is possible to improve the impregnation property of the electrolyte or the cycle characteristics of the cell. Its function is not clearly understood, but the above compound is a compound having high hydrophobicity having an aromatic group, whereby it is attributable to the fact that the compound has a high affinity usually to a component (an electrode or a spacer) of a cell having hydrophobicity. On the other hand, if the hydrophobicity is too high, its affinity to an electrolyte which usually has a high hydrophilicity, tends to be poor, but the above compound has a Group VI element, and has a proper hydrophilicity, whereby due to the balance of both, the above-mentioned effect is considered to be obtainable.

The compound represented by the above formula (1) is preferably contained in the electrolyte of the lithium secondary cell element. In such a case, if the compound is permitted to be uniformly present in the electrolyte, the impregnation property of the electrolyte and the cycle characteristics will be more improved. For example, in a case where as an electrolyte, one containing an electrolytic solution having a lithium salt dissolved in a non-aqueous solvent, is to be used, if one capable of being dissolved in the electrolytic solution to be used, is employed as the above compound, the above compound will be uniformly present in the electrolyte.

The amount of the compound of the above formula (1) present in the lithium secondary cell element is optionally selected depending upon the type of the above compound or the required characteristics, but there is a tendency that the larger the amount, the more the improvement of the cycle characteristics. However, if the amount is too much, no further remarkable improvement of the cycle characteristics tends to be observed, and in some cases, there may be an adverse effect to other cell characteristics. Further, in a case where the amount is small, the cycle characteristics tend to deteriorate. As the amount, the compound of the above formula (1) is permitted to be present usually at most 15 wt %, preferably at most 11 wt %, more preferably at most 10 wt %, further preferably at most 8 wt %, particularly preferably at most 7.6 wt %, most preferably at most 7.5 wt % and usually at least 1 wt %, preferably at least 2 wt %, more preferably at least 4 wt %, further preferably at least 5.5 wt %, most preferably at least 6 wt %, based on the weight of the electrolytic solution.

Here, the weight of the electrolytic solution is the amount containing the weight of the above compound. Namely, in a case where the electrolytic solution comprises a lithium salt, a non-aqueous solvent and a compound of the above formula (1), a weight obtained by totaling the respective weights will be the weight of the electrolytic solution.

When an electrolyte containing an electrolytic solution having a lithium salt dissolved in a non-aqueous solvent, is used, the most preferred amount is a weight of more than 5 wt % and not more than 7.5 wt %, based on the weight of the above electrolytic solution.

The electrolyte layer usually comprises a spacer made of a porous sheet impregnated with the electrolyte. The spacer is a porous film provided between the positive electrode and the negative electrode, which insulates these and supports the electrolyte layer. The material for the spacer may, for example, be a polyolefin such as polyethylene or polypropylene, a polyolefin wherein a part or all of the hydrogen atoms are substituted by fluorine atoms, or a polymer such as polyacrylonitrile or polyaramid. A polyolefin or a fluorine-substituted polyolefin is preferred. Specifically, polyethylene, polypropylene, polytetrafluoroethylene or polyvinylidene fluoride may, for example, be mentioned. It may be a copolymer containing monomer units of the above-mentioned polymer, or a mixture of such polymers. The spacer may be a stretched film formed by uniaxial or biaxial stretching, or may be a nonwoven fabric. The film thickness of the spacer is usually at most 100 $\mu$m, preferably at most 50 $\mu$m, more preferably at most 30 $\mu$m, most preferably at most 20 $\mu$m. If the film thickness is too much, the rate characteristics or the volume energy density of the cell tends to be low. Further, when it is too thin, cutting tends to be difficult because of insufficient rigidity, and short circuiting is likely to occur. Therefore, the film thickness is usually at least 5 $\mu$m, preferably at least 7 $\mu$m, more preferably at least 8 $\mu$m. The porosity of the spacer is usually from 45 to 90%, preferably from 45 to 75%. If the porosity is too large, the mechanical strength will be insufficient, and if it is too small, e.g. the rate characteristics of the cell tend to be low.

The planar shape of the electrode is optional, and may be quadrangular, circular, polygonal or the like.

As illustrated in FIGS. 11 and 13, the current collectors 22 and 26, or 35a and 35b, are usually provided with tabs 4a and 4b for connection to leads. When the electrode is quadrangular, usually as illustrated in FIG. 2, the tab 4a protruding from the positive electrode current collector, is formed in the vicinity of one end of one side of the electrode, and, the tab 4b of the negative electrode current collector is formed in the vicinity of the other end.

Stacking a plurality of the cell elements is effective to increase the capacity of the cell, and in this method, the tabs 4a and the tabs 4b from the respective cell elements are usually respectively bonded in the direction of the thickness to form terminal portions of the positive electrode and the negative electrode. As a result, it becomes possible to obtain a cell element 1 having a large capacity.

To the tabs 4a and 4b, leads 21 made of a metal foil are bonded as illustrated in FIG. 2. As a result, the leads 21 and the positive electrode and the negative electrode of the cell are connected electrically. Bonding between the tabs 4a one another, tabs 4b one another, and between the tabs 4a and the lead 21, or the tabs 4b and the lead 21 can be performed by resistance welding such as spot welding, ultrasonic welding or laser welding.

In the present invention, for at least one, preferably both of the above-mentioned positive and negative electrode leads 21, an annealed metal is preferably used. As a result, a cell excellent not only in the strength but also in the durability against folding, can be obtained.

As a type of the metal to be used for the leads, aluminum, copper, nickel or SUS, may, usually, be used. A material preferred for the positive electrode lead is aluminum. A material preferred for the negative electrode lead is copper.

The thickness of a lead 21 is usually at least 1 $\mu$m, preferably at least 10 $\mu$m, more preferably at least 20 $\mu$m, most preferably at least 40 $\mu$m. If it is too thin, the mechanical strength such as the tensile strength tends to be insufficient. Further, the thickness of the lead is usually at most 1000 $\mu$m, preferably at most 500 $\mu$m, more preferably at most 100 $\mu$m. If it is too thick, the durability against folding tends to deteriorate, and sealing of the cell element by the casing tends to be difficult. The advantage obtainable by using, for the lead, an annealed metal as described hereinafter, becomes more distinct as the thickness of the lead becomes thicker.

The width of the lead is usually at least 1 mm and at most 20 mm, particularly, at least 1 mm and at most about 10 mm, and the length of the lead exposed to the outside is usually at least 1 mm and at most about 50 mm.

In the present invention, the sheathing material to be used for the casing to accommodate the lithium secondary cell element is preferably one having a variable shape. With a sheathing material having a variable shape, cells of various shapes can easily be prepared, and besides, when the sheathing member is sealed in a vacuum state, it is possible to impart a function to strengthen the bonding between the electrodes of the cell element. As a result, it is possible to improve the cell characteristics such as the cycle characteristics. The thickness of the sheathing member should better be as thin as possible, whereby the volume energy density of the cell or the weight energy density will be high. Not only that, the strength itself will be relatively low, and it is likely to swell at the time of overcharging, whereby the effect of the present invention will be particularly distinct. The thickness of the sheathing member is usually at most 0.2 mm, preferably at most 0.15 mm. However, if it is too thin, deficiency in the strength tends to be distinct, and moisture, etc., tend to be permeated therethrough. Accordingly, it is usually at least 0.01 mm, preferably at least 0.02 mm.

As the material for the sheathing member, a metal such as aluminum, nickel-plated iron or copper, or a synthetic resin, may, for example, be employed. Preferred is a laminated film provided with a gas barrier layer and a resin layer, particularly, a laminated film having resin layers formed on both sides of a gas barrier layer. Such a laminated film not only has high gas barrier performance, but also has high shape-variability and thinness. As a result, reducing the thickness and weight of the sheathing material becomes possible, and the capacity per volume of the cell can be improved. Further, when a laminated film having such weak rigidity is used, the cell is likely to swell and tends to be ruptured at the time of overcharging, whereby the effect of the present invention such that the safety at the time of overcharging is improved, will be obtained more remarkably.

As the material for the gas barrier layer to be employed in the laminated film, a metal such as aluminum, iron, copper, nickel, titanium, molybdenum or gold, an alloy such as stainless steel or hastelloy, or a metal oxide such as silicon dioxide or aluminum oxide, may be used. Preferred is aluminum which is light in weight and excellent in workability.

As the resin to be used for the resin layer, various types of synthetic resins such as thermo-plastics, thermoplastic elastomers, thermosetting resins or plastic alloys may be used. These resins include ones mixed with a bulking agent such as a filler.

As a specific construction of the laminated film, as illustrated in FIG. 14(A), one having a gas barrier layer 40 and a synthetic resin layer 41 laminated, may be used. Further, a more preferred laminated film is a three layer laminate, as illustrated in FIG. 13(B), wherein a synthetic resin layer 41 functioning as an external protection layer, is laminated on the external surface of a gas barrier layer 40, and a synthetic resin layer 42 functioning as an internal protection layer for preventing a corrosion caused by the electrolyte and preventing the contact of the gas barrier layer with the cell element, and protecting the gas barrier layer, is laminated on the inner surface of the gas barrier layer 40 to form this three layer laminate.

In this case, the resin used for the external protection layer is preferably a resin excellent in chemical resistance or in mechanical strength, such as polyethylene, polypropylene, modified polyolefin, ionomer, non-crystalline polyolefin, polyethylene terephthalate or polyamide.

As a resin for the internal protection layer, a synthetic resin having chemical resistance is used. For example, polyethylene, polypropylene, modified polyolefin, ionomer or an ethylene-vinyl acetate copolymer may be used.

Further, the laminated film is preferred since, as illustrated in FIG. 14(C), it is also possible to provide an adhesive layer 43 between the gas barrier layer 40 and the synthetic resin layer 41 which is for forming a protection layer, and between the gas barrier layer 40 and the synthetic resin layer 42 which is for forming a corrosion resisting layer. Further, in order to bond the sheathing members to each other, an adhesive layer made of a resin such as polyethylene or polypropylene, which can be deposited on the innermost surface of the composite member, may be provided.

The thickness of such a laminated film is usually from 10 to 1000 $\mu$m, preferably from 50 to 200 $\mu$m. If this thickness is too thin, the strength tends to deteriorate, and if it is too thick, the workability tends to be low.

In the present invention, it is particularly preferred to use a laminated film having a metal foil interposed to have a structure of a resin layer/metal foil/resin layer, with a view to securing heat release. In such a case, the thickness of the resin layer is preferably from 10 to 100 $\mu$m, and the thickness of the metal foil is preferably from 10 to 100 $\mu$m.

To form a sheathing member having a casing shape from such a lamented film, the periphery of the film-form member may be fused, or the sheet-form member may be subjected to drawing by vacuum forming, pressure forming, press-molding or the like. Further, it may be formed by injection molding a synthetic resin. In the case of injection molding, it is common to form a gas barrier layer of e.g. a metal foil by sputtering or the like.

The receiving portion, which is a recess of the sheathing member, can be formed by e.g. deep-drawing.

Further, the thickness of the lithium secondary cell of the present invention is usually at least 0.1 mm, preferably at least 0.2 mm, more preferably at least 0.4 mm and on the other hand, usually at most 10 mm, preferably at most 4 mm, more preferably at most 3.5 mm, particularly preferably at most 3 mm. If the lithium secondary cell is too thick, the heat release efficiency tends to be low. Further, it takes time for heat transmission, whereby heat storage at the center portion may sometimes proceed too much. If it is too thin, the capacity tends to be low.

Electrical equipments, for which the lithium secondary cell of the present invention is useful as a power source, are not particularly limited. Such electrical equipments include, for example, a notebook computer, a pen input type personal computer, a mobile personal computer, an electric book player, a mobile phone, a codeless phone extension, a pager, a handy terminal, a portable facsimile, a portable copying machine, a portable printer, a headphone stereo, a video movie, a liquid crystal TV, a handy cleaner, a portable CD, a mini disk, an electric shaver, a transceiver, an electronic databook, an electric calculator, a memory card, a portable tape recorder, a radio, a backup power source, a motor, a luminaire, a toy, a game machine, a load conditioner, a clock, a strobe, a camera, and medical equipments (a pace maker, a hearing aid, a massager, etc.).

Among such various electrical equipments, those to which the lithium secondary cell of the present invention can be preferably applied, are portable type electrical equipments such as a mobile phone, a watch and a mobile personal computer. Such electrical equipments are desired to have a high level of safety, and the effect of using the present invention will thereby be distinct.

EXAMPLES

Now, the present invention will be described in further detail with reference to Examples and Comparative Examples. However, the present invention is by no means restricted by the following Examples and can be optionally modified and embodied within a range not to change the gist of the present invention.

In the following, "parts" in the composition represents "parts by weight".

Example 1

Production of a Positive Electrode

90 Parts of a lithium-nickel compound oxide having a part of nickel sites substituted by cobalt and aluminum ($Li_\alpha Ni_X Co_Y Al_Z O_2$ ($\alpha$=1.02, X=0.82, Y=0.15, Z=0.03)) (specific surface area: 0.4 m$^2$/g, average secondary particle size: 10 $\mu$m), 5 parts of acetylene black, 5 parts of polyvinylidene fluoride and 80 parts of N-methyl-2-pyrrolidone were kneaded by a kneading machine for 2 hours to form positive electrode coating material 1.

Then, the positive electrode coating material 1 was coated on an aluminum current collector substrate having a thickness of 20 $\mu$m by an extrusion type die coating and dried to form a positive electrode active material layer made of a porous film having an active material fixed on a current collector by a binder, followed by compaction by means of a roll press (calender). Thereafter, the electrode portion was cut into a size of 3 cm×5 cm to obtain positive electrode 1. The thickness of the formed positive electrode active material layer was 55 µm.

Production of a Negative Electrode

90 Parts of graphite (average particle size: 15 µm), 10 parts of polyvinylidene fluoride and 100 parts of N-methyl-2-pyrrolidone were kneaded by a kneading machine for 2 hours to obtain negative coating material 1.

Then, the negative coating material 1 was coated on a copper current collector substrate having a thickness of 20 µm by an extrusion type die coating and dried to form a negative electrode active material layer made of a porous film having an active material fixed on a current collector by a binder, followed by compaction by a roll press (calender). Thereafter, the electrode portion was cut into 3 cm×5 cm to obtain negative electrode 1. The thickness of the formed negative electrode active material layer was 60 µm.

Production of an Electrolyte Coating Material

925 Parts of a mixed liquid of ethylene carbonate and propylene carbonate (volume ratio of ethylene carbonate:propylene carbonate=1:1) containing 1 M concentration of $LiPF_6$, 44 parts of tetraethylene glycol diacrylate, 22 parts of polyethylene oxide triacrylate, 2 parts of a polymerization initiator and 9 parts of an additive (succinic anhydride) were mixed, stirred and dissolved to obtain electrolyte coating material 1.

Preparation of a Cell and Overcharging Test

The positive electrode 1 and the negative electrode 1 were coated with the electrolyte coating material 1 and laminated with a polyethylene porous film (thickness:15 µm) separately soaked with the electrolyte coating material 1, interposed, followed by heating at 90° C. for 10 minutes to solidify the electrolyte and thereby to obtain a flat plate-shaped unit cell element having the positive electrode, the negative electrode and the non-fluid electrolyte, as shown in FIG. 11.

To the terminals of the unit cell element thus obtained, leads to take out electric currents, were connected. Thereafter, the cell element was accommodated in sheathing members opposingly formed from a laminated film having a polypropylene layer (thickness:40 µm) inside of an aluminum layer (thickness: 40 µm) and a polyamide layer (thickness: 25 µm) outside of the aluminum layer, and which has a thickness of about 100 µm, a long side of 6.5 cm and a short side of 4 cm and followed by vacuum sealing to obtain a lithium secondary cell as shown in FIGS. 8 and 9. The cell capacity C of a flat plate-shaped cell A prepared in such a manner, was 32 mAh; the cell surface area S was 52.4 $cm^2$; the bonded portion area ratio was 26%; the thickness of the cell was 0.36 mm, and the surface area capacity ratio S/C was 1.63.

Here, the discharge capacity C was measured as follows. Namely, constant current charging was carried out at 1 C (32) mA up to 4.2 V, and then, constant voltage charging was carried out at 4.2 V until the change in the charging current value within 1 hour would be within 10%, whereby the cell A was fully charged. Then, discharging was carried out to 3.0 V at a current such that 4.2 V would become 3.0 V in 10 hours, whereby the cell capacity was obtained. This method for measuring the discharge capacity was used in the same manner also in Examples 2 to 7 and Comparative Example 1.

This flat plate-shaped cell A was subjected to an overcharging test.

In the overcharging test, the upper limit voltage was set to be 10 V, and the cell was charged for 120 minutes from the discharged state at a constant current of 3 C (96 mA). As a result, neither smoking nor ignition of the cell was observed under the overcharging condition, and thus, this flat plate-shaped cell B was confirmed to be a cell which is highly safe and durable against overcharging at 3 C.

Example 2

Flat plate-shaped cell B was prepared in the same manner as in Example 1 except that two such unit cell elements as prepared in Example 1 were stacked, and their terminals were put together and connected to leads.

The cell capacity C of the flat plate-shaped cell B was 64 mAh; the cell surface area S was 52.4 $cm^2$; the bonded portion area ratio was 26%; the thickness of the cell was 0.52 mm; and the surface area capacity ratio S/C was 0.82.

This flat plate-shaped cell B was subjected to an overcharging test.

In the overcharging test, the upper limit voltage was set to be 10 V, and the cell was charged for 120 minutes from the discharged state at a constant current of 3 C (192 mA). As a result, neither smoking nor ignition of the cell was observed under the overcharged condition, and this flat plate-shaped cell B was confirmed to be a cell which is highly safe and durable against overcharging at 3 C.

Example 3

In Example 1, the size of the positive electrode and the negative electrode was changed to 5.2 cm×3.3 cm, and they were used as positive electrode 2 and negative electrode 2. A unit cell element was prepared in the same manner as in Example 1 except that the positive electrode 2 and the negative electrode 2 were used. Twenty such unit cell elements were stacked, and their terminals were put together and connected to leads. The same laminated film as used in Example 1 was preliminarily opposingly shaped as shown in FIG. 6 to obtain a sheathing member. In the same manner as in Example 1 except for this construction, a flat plate-shaped cell C was prepared.

The cell capacity C of the flat plate-shaped cell C was 730 mAh; the cell surface area S was 55.6 $cm^2$; the bonded portion area ratio was 14.8%; the thickness of the cell was 3.3 mm; and the surface area capacity ratio S/C was 0.076.

This flat plate-shaped cell C was subjected to a overcharging test.

In the overcharging test, the upper limit voltage was set to be 10 V, and the cell was charged for 120 minutes from the discharged state at a constant current of 3 C (2190 mA). As a result, neither smoking nor ignition of the cell was observed under the overcharging condition, and thus this flat plate-shaped cell C was confirmed to be a cell which is highly safe and durable against overcharging at 3 C.

Example 4

A positive electrode coating material 2 was produced in the same manner as in Example 1 except that instead of the lithium nickel compound oxide in Example 1, a lithium-nickel compound oxide ($Li_\alpha Ni_X Co_Y Al_Z O_2$ ($\alpha$=1.05, X=0.82, Y=0.15, Z=0.03)) (specific surface area: 1.1 $m^2/g$, average secondary particle size: 10 µm) was used. Using this positive electrode coating material 2, a positive electrode 3 was prepared in the same manner, and except for using this positive electrode 3 for a unit cell element, a flat plate-shaped cell D was prepared in the same manner as in Example 1.

The cell capacity of this flat plate-shaped cell D was 31 mAh; the cell surface area S was 52.4 cm$^2$; the bonded portion area ratio was 26%; the thickness of the cell was 0.35 mm; and the surface area capacity ratio S/C was 1.68.

This flat plate-shaped cell D was subjected to an overcharging test.

In the overcharging test, the upper limit voltage was set to be 10 V, and the cell was charged for 120 minutes from the discharged state at a constant current of 3 C (93 mA). As a result, neither smoking nor ignition of the cell was observed under the overcharging condition, and this flat plate-shaped cell B was confirmed to be a cell which is highly safe and durable against overcharging at 3 C.

Example 5

A positive electrode coating material 3 was prepared in the same manner as in Example 1 except that in Example 1, the lithium-nickel compound oxide was changed to a lithium-nickel compound oxide ($Li_\alpha Ni_X Co_Y Al_Z O_2$ ($\alpha$=1.01, X=0.80, Y=0.15, Z=0.05)) (specific surface area: 0.8 m$^2$/g, average secondary particle size: 8 $\mu$m) and lithium cobaltate ($LiCoO_2$) (specific surface area: 0.5 m$^2$/g, average secondary particle size: 5 $\mu$m), and the lithium nickel compound oxide and the lithium cobaltate were used as mixed in a ratio of 7:3 (weight ratio). Except that this positive electrode coating material 3 was used and the thicknesses of the positive electrode active material layer and the negative electrode active material layer were adjusted so that the ratio between the positive electrode charging capacity and the negative electrode capacity in Example 3 became equal, twenty unit cell elements wherein the size of the positive electrodes and the negative electrodes was 5.2 cm×3.3 cm, were stacked in the same manner as in Example 3 to prepare a flat plate-shaped cell E.

The cell capacity C of this flat plate-shaped cell E was 700 mAh; the cell surface area S was 55.4 cm$^2$; the bonded portion area ratio was 14.9%; the thickness of the cell was 3.2 mm; and the surface capacity ratio S/C was 0.079.

This flat plate-shaped cell E was subjected to an overcharging test.

In the overcharging test, the upper limit voltage was set to be 10 V, and the cell was charged for 120 minutes from the discharged state at a constant current of 3 C (2100 mA). As a result, neither smoking nor ignition of the cell was observed under the overcharging condition, and thus, this flat plate-shaped cell E was confirmed to be a cell which is highly safe and durable against overcharging at 3 C.

Comparative Example 1

A flat plate-shaped cell F was prepared in the same manner as in Example 3 except that forty unit cell elements were stacked.

The cell capacity C of the flat plate-shaped cell F was 1460 mAh; the cell surface area S was 61.2 cm$^2$; the bonded portion area ratio was 13.5%; the thickness of the cell was 6.4 mm; and the surface area capacity ratio S/C was 0.042.

This flat plate-shaped cell F was subjected to an overcharging test.

In the overcharging test, the upper limit voltage was set to be 10 V, and the cell was charged for the maximum of 120 minutes from the discharged state at a constant current of 3 C (4380 mA). As a result, the cell caught fire upon expiration of 30 minutes from the initiation of the test.

The foregoing results are summarized in Table 2.

TABLE 2

| | Examples | | | | | Comparative Example |
|---|---|---|---|---|---|---|
| | 1 | 2 | 3 | 4 | 5 | 1 |
| Specific surface area of lithium-nickel compound oxide (m$^2$/g) | 0.4 | 0.4 | 0.4 | 1.1 | 0.8 | 0.4 |
| Cell surface area S (Cm$^2$) | 52.4 | 52.4 | 55.6 | 52.4 | 55.4 | 61.2 |
| Cell capacity C (mAH) | 32 | 64 | 730 | 31 | 700 | 1460 |
| Surface area capacity ratio S/C | 1.63 | 0.82 | 0.076 | 1.68 | 0.079 | 0.042 |
| Overcharging test | No smoking or ignition | | | | | Ignition |

From Table 2, it is evident that the lithium secondary cells of the present invention are highly safe at the time of overcharging.

Example 6

Production of a Positive Electrode

A positive electrode coating material 4 was prepared in the same manner as in Example 1 except that in Example 1, the lithium-nickel compound oxide was changed to a lithium-nickel compound oxide ($Li_\alpha Ni_X Co_Y Al_Z O_2$ ($\alpha$=1.05, X=0.82, Y=0.15, Z=0.03)) (specific surface area: 0.5 m$^2$/g, average secondary particle size: 7 $\mu$m) and lithium cobaltate ($LiCoO_2$) (specific surface area: 0.5 m$^2$/g, average secondary particle size: 5 $\mu$m), and further 64.4 parts of the above lithium-nickel compound oxide, 27.6 parts of the above lithium cobaltate, 4 parts of acetylene black and 4 parts of polyvinylidene fluoride (weight ratio) were mixed.

Then, the positive electrode coating material 4 was coated on an aluminum current collector substrate having a thickness of 15 $\mu$m by an extrusion type die coating and dried to form a positive electrode active material layer made of a porous film having an active material fixed on a current collector by a binder, followed by compaction by means of a roll press (calender). Thereafter, the electrode portion was cut into a size of 3.2 cm×5.2 cm to obtain a positive electrode 4. The thickness of the formed positive electrode active material layer was 53.5 $\mu$m.

Production of a Negative Electrode 91.8 Parts of graphite (average particle size: 15 $\mu$m), 8.2 parts of polyvinylidene fluoride and 100 parts of N-methyl-2-pyrrolidone were kneaded for 2 hours by a kneading machine to obtain a negative electrode coating material 2.

Then, the negative coating material 2 was coated on a copper current collector substrate having a thickness of 8 $\mu$m by an extrusion type die coating and dried to form a negative electrode active material layer made of a porous film having an active material fixed on a current collector by a binder, followed by compaction by means of a roll press (calender). Thereafter, the electrode portion was cut into 3.3 cm×5.25 cm to obtain a negative electrode 4. The thickness of the formed negative electrode active material layer was 62.5 $\mu$m.

Production of an Electrolyte Coating Material

921 Parts of a mixed liquid of ethylene carbonate and propylene carbonate (volume ratio of ethylene carbonate:propylene carbonate=1:1) containing 1 M concentration of $LiPF_6$, 30 parts of phenylether, 47 parts of tetraethylene glycol diacrylate, 23 parts of polyethylene oxide triacrylate, 10 parts of dimethyl sulfone, 5 parts of a surfactant, 2 parts of a polymerization initiator and 9 parts of an additive (succinic anhydride) were mixed, stirred and dissolved to obtain an electrolyte coating material 2.

Preparation of a Cell and Overcharging Test

The positive electrode 4 and the negative electrode 2 were coated with the electrolyte coating material 2 and laminated with a polyethylene porous film (thickness: 9 μm) separately soaked with the electrolyte coating material 2, interposed, followed by heating at 90° C. for 10 minutes to solidify the electrolyte and thereby to prepare a flat plate-shaped unit cell element having the positive electrode, the negative electrode and the non-fluid electrolyte, as shown in FIG. 11.

Then, in the same manner as in Example 3, twenty-two unit cell elements were stacked, and terminals of the obtained unit cell elements were respectively put together, and leads to take out electric currents, were connected thereto. Thereafter, the cell element was accommodated in a sheathing member prepared by opposingly shaping a laminated film having a thickness of about 110 μm, a long side of 6.1 cm and a short side of 4 cm and having a polypropylene layer (thickness: 40 μm) inside of the aluminum layer (thickness: 40 μm) and a polyamide layer (thickness: 25 μm) outside of the aluminum layer, followed by vacuum sealing to obtain a flat plate-shaped lithium secondary cell G as shown in FIGS. 8 and 9. The cell capacity C of the flat plate-shaped cell G thus prepared, was 850 mAh; the cell surface area S was 55.0 cm$^2$; the bonded portion area ratio was 20%; the thickness of the cell was 3.78 mm; and the surface area capacity ratio S/C was 0.065.

This flat plate-shaped cell G was subjected to an overcharging test.

In the overcharging test, the upper limit voltage was set to be 10 V, and the cell was charged for 120 minutes from the discharged state at a constant current corresponding to 1.8 C (1440 mA). As a result, neither smoking nor ignition of the cell was observed under the overcharging condition, and thus, this flat plate-shaped cell G was confirmed to be a cell which is highly safe and durable against overcharging corresponding to 1.8 C.

Example 7

Production of a Positive Electrode

A positive electrode coating material 5 was prepared in the same manner as in Example 1 except that in Example 1, the lithium-nickel compound oxide was changed to a lithium-nickel compound oxide ($Li_\alpha Ni_X Co_Y Al_Z O_2$ ($\alpha$=1.05, X=0.82, Y=0.15, Z=0.03)) (specific surface area: 0.5 m$^2$/g, average secondary particle size: 7 μm) and lithium cobaltate ($LiCoO_2$) (specific surface area: 0.5 m$^2$/g, average secondary particle size: 5 μm), and further, 63 parts of the lithium-nickel compound oxide, 27 parts of the lithium cobaltate, 5 parts of acetylene black and 5 parts of polyvinylidene fluoride (weight ratio) were mixed.

Then, the positive electrode coating material 5 was coated on an aluminum current collector substrate having a thickness of 15 μm by an extrusion type die coating and dried to form a positive electrode active material layer made of a porous film having an active substance fixed on a current collector by a binder, followed by compaction by means of a roll press (calender). Then, the electrode portion was cut into a size of 3.2 cm×5.2 cm to obtain a positive electrode 5. The thickness of the formed positive electrode active material layer was 51 μm.

Production of a Negative Electrode

90 Parts of graphite (average particle size: 15 μm), 10 parts of polyvinylidene fluoride and 100 parts of N-methyl-2-pyrrolidone were kneaded for 2 hours by a kneading machine to obtain a negative electrode coating material 3.

Then, the negative coating material 3 was coated on a copper current collector substrate having a thickness of 10 μm by an extrusion type die coating and dried to form a negative electrode active material layer made of a porous film having an active material fixed on a current collector by a binder, followed by compaction by a roll press (calender). Then, the electrode portion was cut into 3.3 cm×5.25 cm to obtain a negative electrode 5. The thickness of the formed negative electrode active material layer was 60.2 μm.

Production of an Electrolyte Coating Material

921 Parts of a mixed liquid of ethylene carbonate and propylene carbonate (volume ratio of ethylene carbonate:propylene carbonate=1:1) containing 1 M concentration of $LiPF_6$, 20 parts of phenylether, 47 parts of tetraethylene glycol diacrylate, 23 parts of polyethylene oxide triacrylate, 10 parts of dimethyl sulfone, 5 parts of a surfactant, 2 parts of a polymerization initiator and 9 parts of an additive (succinic anhydride) were mixed, stirred and dissolved to obtain an electrolyte coating material 3.

Preparation of a Cell and Overcharging Test

The positive electrode 5 and the negative electrode 5 were coated with the electrolyte coating material 3 and laminated with a polyethylene porous film (thickness: 9 μm) separately soaked with the electrolyte coating material 3, interposed, followed by heating at 90° C. for 10 minutes to solidify the electrolyte and thereby to prepare a flat plate-shaped unit cell element having the positive electrode, the negative electrode and the non-fluid electrolyte, as shown in FIG. 11.

Then, in the same manner as in Example 3, twenty-two unit cell elements were stacked, and terminals of the obtained unit cell elements were respectively put together, and leads to take out electric currents were connected thereto. Thereafter, the cell element was accommodated in a sheathing member prepared by opposingly shaping a laminated film having a thickness of about 110 μm, a long side of 6.1 cm and a short side of 4 cm and having a polypropylene layer (thickness: 40 μm) inside of the aluminum layer (thickness: 40 μm) and a polyamide layer (thickness: 25 μm) outside of the aluminum layer, followed by vacuum sealing to obtain a flat plate-shaped lithium secondary cell H as shown in FIGS. 8 and 9. The cell capacity C of the flat plate-shaped cell H thus prepared, was 767 mAh; the cell surface area S was 54.8 cm$^2$; the bonded portion area ratio was 20%; the thickness of the cell was 3.66 mm; and the surface area capacity ratio S/C was 0.072.

This flat plate-shaped cell H was subjected to an overcharging test.

In the overcharging test, the upper limit voltage was set to be 10 V, and the cell was charged for 120 minutes from the discharged state at a constant current corresponding to 1.8 C (1296 mA). As a result, neither smoking nor ignition of the cell was observed under the overcharging condition, and thus, this flat plate-shaped cell H was confirmed to be a cell which is highly safe and durable against overcharging corresponding to 1.8 C.

INDUSTRIAL APPLICABILITY

As described in the foregoing, according to the present invention, a lithium secondary cell can be provided which is a lithium secondary cell using a lithium-nickel compound oxide having a high capacity as a positive electrode active material and which is highly safe against overcharging. The lithium secondary cell of the present invention provides an essential safety function to a lithium secondary cell by controlling the value for the area per capacity of the lithium secondary cell, whereby a highly safe lithium secondary cell can be realized without requiring any other measure against overcharging. Further, in combination with any other measure against overcharging, a more safe lithium secondary cell may be obtained.

The present invention has been described in detail with reference to specific embodiments. However, it is apparent to those skilled in the art that various changes and modifications are possible without departing from the concept and the range of the present invention.

Further, this application is based on a Japanese Patent Application filed on Apr. 16, 2001 (JP2001-117082), and the entirety is included by reference.

What is claimed is:

1. A lithium secondary cell comprising a lithium secondary cell element using, as a positive electrode active material, a lithium-nickel compound oxide containing lithium and nickel, accommodated in a casing, wherein the specific surface area of the lithium-nickel compound oxide is from 0.1 to 10 m²/g, and a surface area capacity ratio S/C, i.e. a ratio of a cell surface area S (cm²) to a cell capacity C (mAh), is from 0.05 to 5 wherein S is defined as the outside surface area of the casing accommodating the cell element and C is defined as the maximum discharge capacity obtainable when the cell is discharged from a fully charged state of 4.2 V to 3.0 V at such a current that 3.0 V will be reached at 10 hours.

2. The lithium secondary cell according to claim 1, wherein the cell surface area S is from 1 to 200 cm².

3. The lithium secondary cell according to claim 1, wherein the cell capacity C is from 1 to 2,000 mAh.

4. The lithium secondary cell according to claim 1, wherein the casing is made of a laminated film comprising a gas barrier layer and a resin layer.

5. The lithium secondary cell according to claim 1, which has a thickness of at most 4 mm.

6. The lithium secondary cell according to claim 1, wherein the lithium secondary cell element has an electrolytic solution containing propylene carbonate.

7. The lithium secondary cell according to claim 1, wherein the lithium secondary cell element has a non-fluid electrolyte.

8. The lithium secondary cell according to claim 1, wherein the lithium secondary cell element contains a compound of the formula (1):

$$A1\text{-}X\text{-}A2 \qquad (1)$$

wherein X is a Group VI element in the periodic table, and A1 and A2 represent aromatic groups, provided that A1 and A2 may be the same or different, and may be connected to each other to constitute a ring.

9. The lithium secondary cell according to claim 8, wherein X is oxygen.

10. The lithium secondary cell according to claim 8, wherein each of A1 and A2 which are independent of each other, is any one of a phenyl group, a naphthyl group and an anthryl group.

11. The lithium secondary cell according to claim 1, wherein the specific surface area is from about 1 to 3 m²/g.

12. The lithium secondary cell according to claim 1, wherein the lithium-nickel compound oxide is represented by the formula $Li_\alpha Ni_x Co_y Al_z O_2$, wherein $\alpha$ is 0.95–1.15; X is 0.5–1.0; Y is 0–0.5; Z is 0–0.1; and X+Y+Z is from 0.9 to 1.1.

13. The lithium secondary cell according to claim 1, wherein the lithium-nickel compound oxide is represented by the formula $Li_\alpha Ni_x Co_y Al_z O_2$, wherein $\alpha$ is 1.00–1.10; X is 0.7–0.9; Y is 0–0.3; Z is 0–0.05; and X+Y+Z is 1.

14. The lithium secondary cell according to claim 1, wherein the lithium-nickel compound oxide is represented by the formula $Li_\alpha Ni_x Co_y Al_z O_2$, wherein $\alpha$ is 1.00–1.05; X is 0.65–0.85; Y is 0.1–0.3; Z is 0.01–0.05; and X+Y+Z is 1.

15. The lithium secondary cell according to claim 1, wherein the lithium-nickel compound oxide is combined with another positive electrode active material.

16. The lithium secondary cell according to claim 15, wherein the other positive electrode active material comprises a lithium-cobalt compound oxide.

17. The lithium secondary cell according to claim 1, wherein S/C is about 0.2 to 0.85.

18. The lithium secondary cell according to claim 3, wherein C is from about 10 mAh to about 500 mAh.

19. The lithium secondary cell according to claim 3, wherein S is from about 10 to 60cm².

20. The lithium secondary cell according to claim 5, wherein the thickness is at most 3 mm.

* * * * *